US008589717B1

(12) United States Patent
Davis et al.

(10) Patent No.: US 8,589,717 B1
(45) Date of Patent: Nov. 19, 2013

(54) SERIAL PERIPHERAL INTERFACE

(75) Inventors: Paul G. Davis, San Jose, CA (US); Quoc B. Huynh, San Jose, CA (US); John C. Peck, Jr., San Francisco, CA (US)

(73) Assignee: Tabula, Inc., Santa Clara, CA (US)

( * ) Notice: Subject to any disclaimer, the term of this patent is extended or adjusted under 35 U.S.C. 154(b) by 234 days.

(21) Appl. No.: 12/904,157

(22) Filed: Oct. 13, 2010 (Under 37 CFR 1.47)

Related U.S. Application Data

(60) Provisional application No. 61/325,279, filed on Apr. 16, 2010, provisional application No. 61/326,644, filed on Apr. 21, 2010, provisional application No. 61/357,984, filed on Jun. 23, 2010, provisional application No. 61/460,740, filed on Oct. 11, 2010.

(51) Int. Cl.
*G06F 1/00* (2006.01)

(52) U.S. Cl.
USPC .......... 713/500; 713/600

(58) Field of Classification Search
USPC .......... 713/500–600; 375/229
See application file for complete search history.

(56) References Cited

U.S. PATENT DOCUMENTS

| | | | | |
|---|---|---|---|---|
| 7,433,397 | B2 * | 10/2008 | Garlepp et al. | 375/229 |
| 7,624,364 | B2 | 11/2009 | Albrecht et al. | |
| 8,037,340 | B2 * | 10/2011 | Kim et al. | 713/503 |
| 2004/0040005 | A1 | 2/2004 | Carison | |

* cited by examiner

*Primary Examiner* — Brian Misiura
*Assistant Examiner* — Kim Huynh
(74) *Attorney, Agent, or Firm* — Adeli & Tollen LLP

(57) ABSTRACT

For an integrated circuit (IC) that retrieves data from a memory device external to the IC, a novel memory interface module that generates a sampling clock to the memory device and samples the retrieved data is described. The memory interface module adjusts the frequency of the sampling clock and selects a sampling time for sampling the retrieved data. The memory interface includes a training module that monitors a data pin of the memory device for transitions. The training module searches and records the earliest transition and the latest transition with respect to the period of the sampling clock. The memory interface module uses the earliest transition and the latest transition to determine an interval of data uncertainty (uncertainty interval) for the data pin. The memory interface module facilitates determining a new sampling time and a new sampling clock frequency based on the uncertainty intervals.

20 Claims, 15 Drawing Sheets

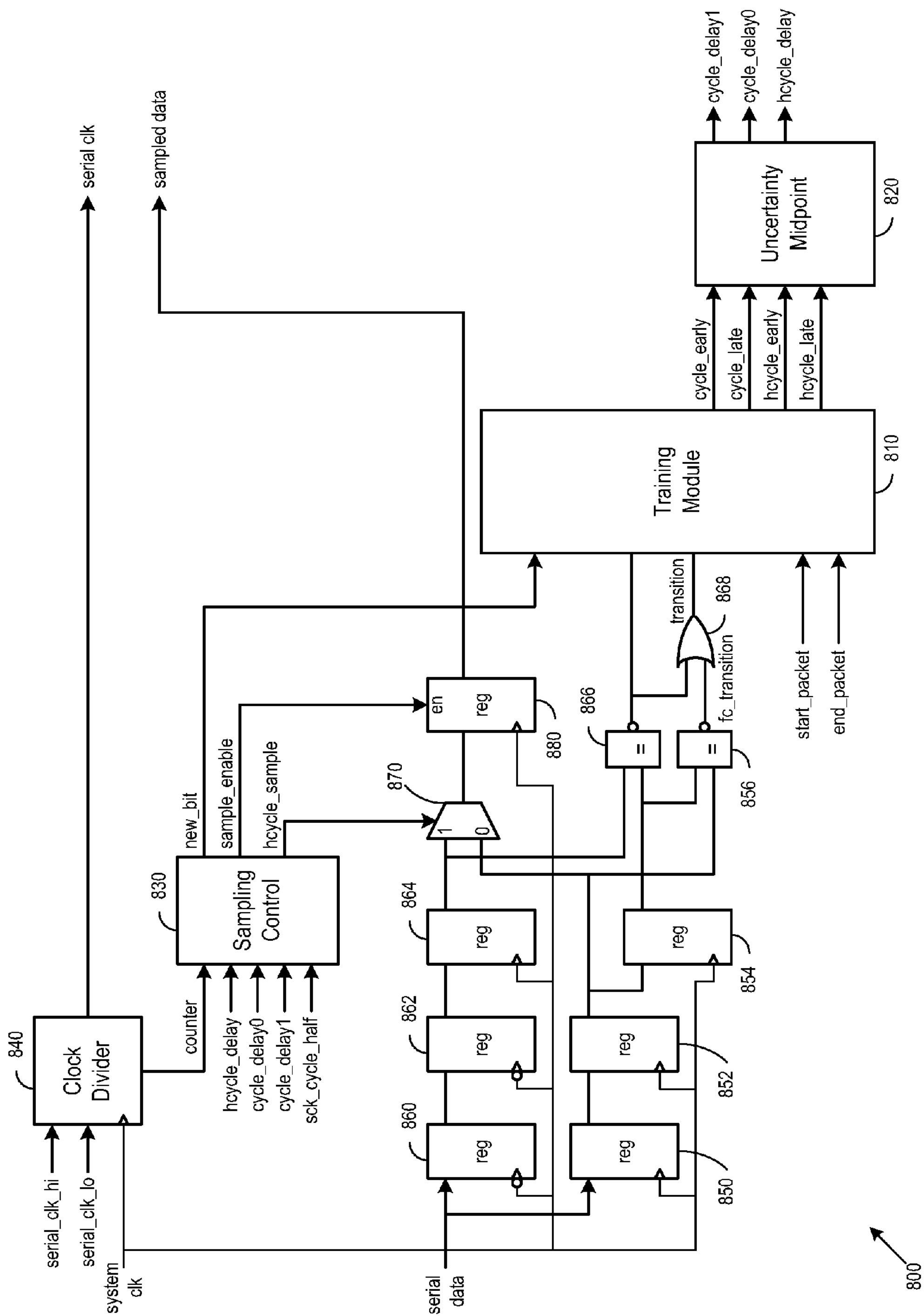
serial clk
sampled data
cycle_delay1
cycle_delay0
hcycle_delay
Figure 8
Uncertainty Midpoint
820
cycle_early
cycle_late
hcycle_early
hcycle_late
Training Module
810
transition
868
fc_transition
start_packet
end_packet
866
856
en
reg
880
870
1
0
new_bit
sample_enable
hcycle_sample
830
Sampling Control
864
reg
862
reg
860
reg
reg
854
reg
852
reg
850
840
Clock Divider
counter
hcycle_delay
cycle_delay0
cycle_delay1
sck_cycle_half
serial_clk_hi
serial_clk_lo
system clk
serial data
800

SERIAL PERIPHERAL INTERFACE

CLAIM OF BENEFIT TO PRIOR APPLICATIONS

The present Application claims the benefit of U.S. Provisional Patent Application 61/325,279, entitled "Serial Peripheral Interface," filed Apr. 16, 2010. The present Application also claims the benefit of U.S. Provisional Patent Application 61/326,644, entitled "Serial Peripheral Interface," filed Apr. 21, 2010. The present Application also claims the benefit of U.S. Provisional Patent Application 61/357,984, entitled "Serial Peripheral Interface," filed Jun. 23, 2010. The present Application also claims the benefit of U.S. Provisional Patent Application 61/460,740, entitled "Serial Peripheral Interface," filed Oct. 11, 2010. U.S. Provisional Patent Applications 61/325,279, 61/326,644, 61/357,984, and 61/460,740 are incorporated herein by reference.

BACKGROUND

The ability to retrieve data from an external memory device is a functionality commonly implemented in many integrated circuits (IC). Although modern integrated circuit fabrication technology allows instantiation of memory modules internal to the integrated circuit, the cost and the flexibility offered by stand-alone memory units external to an IC remain preferable or even necessary to many IC applications. For example, an IC with configurable circuits such as an FPGA is often designed to load its configuration programming automatically from non-volatile external memory devices such as flash or EEPROMs.

A typical operation between an IC and an external memory device involves the retrieval of data from the external memory to the IC. In order for the IC to correctly sample the retrieved data retrieved from the external memory, the retrieved data must arrive at a sampling register in the IC within a specific timing window (e.g., meeting the sampling register's setup and hold time requirements). Ensuring data arrival within the specific timing window usually requires that the timing delay from a common clock source to the memory device and from the memory device to the integrated circuit be known with sufficient certainty. Unfortunately, unlike signal paths within an IC that can be tightly specified with little uncertainty, the timing delays across external signal paths tend to be loosely specified with significant uncertainty.

These large uncertainties in timing delay place a ceiling on the frequency the IC can access the external memory for data retrieval. As data sampled during uncertainty periods is likely invalid, an IC must sample data in the "eyes" between uncertainty periods. If the IC accesses the external memory at too great a frequency, the periods of uncertainty will crowd out these "eyes" and make sampling valid data impossible. Thus, even though modern external memory devices have greatly improved their maximum operating frequencies, few systems are able to use the improvement in memory devices to improve performance. In fact, very little improvement in performance is possible without first minimizing uncertainty in timing delays.

One technique for reducing the effect of timing uncertainties is to place the memory device as close to the IC as possible. Another technique is to add a delay to the IC's internal clock path in order to delay sampling of the retrieved data. These techniques require hardware alterations that are specific to a particular system, requiring an investment in engineering effort that cannot be reutilized. Furthermore, these techniques only address timing uncertainties that are knowable before the system is built and neglect uncertainties that may arise or disappear during real-time operation of the system. These techniques also treat each individual unit as if they are completely identical with identical attributes, failing to take advantage of individual components in the system that may perform faster with less uncertainty. As a result, systems built using these techniques must operate at frequencies low enough to accommodate the worst performing unit.

Thus, there is a need in the art for an IC that can automatically determine timing delay uncertainties for data retrieval from an external memory device. There is also a need for a method or an apparatus for determining an optimal operating frequency for the data retrieval based on the automatically determined timing uncertainties. There is further a need for a method or an apparatus for determining an optimal sampling time for sampling the retrieved data based on the automatically determined timing uncertainties.

SUMMARY

For an integrated circuit (IC) that retrieves data from a memory device external to the IC, some embodiments of the invention provide a memory interface module that generates a serial clock (or sampling clock) to the memory device and samples the retrieved data. The memory interface adjusts the period of the serial clock and selects a sampling time for sampling the retrieved data. The serial clock is derived from a system clock by using an integer divider. The system clock is for clocking at least some of the internal logic circuitry of the IC.

In some embodiments, the serial clock is initially at an initial frequency, the initial frequency is selected for allowing a first data packet to be correctly retrieved from the memory device. While the memory interface is retrieving the first data packet using the serial clock running on the initial frequency, a training module monitors a data pin of the memory device for transitions. The training module searches and records the earliest transition and the latest transition with respect to the period of the serial clock. Some embodiments use the earliest transition and the latest transition to determine an interval of data uncertainty (uncertainty interval) for the data pin. In some embodiments, the transitions on the data pin are recorded by using the system clock. Some of these embodiments determine for each transition whether the transition is a half-cycle transition or a full-cycle transition.

Some embodiments facilitate determining a new sampling time and a new serial clock frequency based on the uncertainty intervals. In some embodiments, the new sampling time is the earliest point in time following an interval of uncertainty where the data pin does not transition. In some embodiments, the new sampling time is based on a center point between two consecutive uncertainty intervals. In some embodiments, the new serial clock frequency is determined so to provide a sufficiently large interval of data validity for sampling between uncertainty intervals. In some embodiments, the newly determined serial clock frequency is further based on a set of information. The set of information includes at least some or all of the following: (i) temperature, (ii) interference between electrical wires, (iii) noise, (iv) timing uncertainties specified by manufacturers, and (v) granularity of samples.

In order to obtain additional timing margin, some embodiments select the new sampling time at a granularity level of half of a cycle of the system clock. In some of these embodiments, the new sampling time can correspond to either a rising edge or a falling edge of the system clock. Some embodiments determine whether the new sampling time should occur at a half-cycle based on (i) whether the earliest transition on the data pin is a half-cycle transition, (ii) whether the latest transition on the data pin is a half-cycle transition, and (iii) whether the difference in number of clock cycles between the earliest transition and the latest transition is odd or even. Some embodiments further adjust the new sampling time by half of a system clock cycle by determining whether the period of the new serial clock cycle has an odd or even number of system clock cycles.

Some embodiments include the memory interface module in an IC that includes one or more configurable circuits. The memory interface module is for retrieving configuration data for configuring the configurable circuits. The configurable circuits in the IC can be configured to perform different functions according to different sets of configuration data. In some of these embodiments, the configurable circuits includes configurable logic circuits and configurable interconnect circuits. In some of these embodiments, some or all of these configurable circuits are run-time reconfigurable circuits. Examples of ICs that include real-time reconfigurable logic circuits and real-time reconfigurable interconnect circuits can be found in U.S. Pat. No. 7,295,037. In some of these embodiments, the IC includes a configuration controller that processes the configuration data and configures the configurable circuits through a configuration network (CN). Examples of configuration controllers and configuration networks can be found in U.S. Pat. No. 7,375,550. In some embodiments, the memory controller is included within the configuration controller.

In some embodiments, the memory interface module retrieves data from flash memory, where the flash memory is a serial peripheral interface (SPI) compliant device. In some embodiments, the memory interface module delivers the configuration data retrieved from the flash memory to the configuration network via a configuration controller bus (BUS). In some embodiments, the configuration controller bus is also used by other modules in the IC to communicate with each other and/or with the memory interface module. In some embodiments, the memory interface module is part of an IC that does not include any configurable or reconfigurable circuits. Some embodiments use the memory interface to retrieve data from an external storage device that produces multiple bits of data for each strobe signal.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed.

BRIEF DESCRIPTION OF THE DRAWINGS

The novel features of the invention are set forth in the appended claims. However, for purpose of explanation, several embodiments of the invention are set forth in the following figures.

FIG. 8 illustrates an example implementation of a memory interface module.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

I. OVERVIEW

Figure 1:
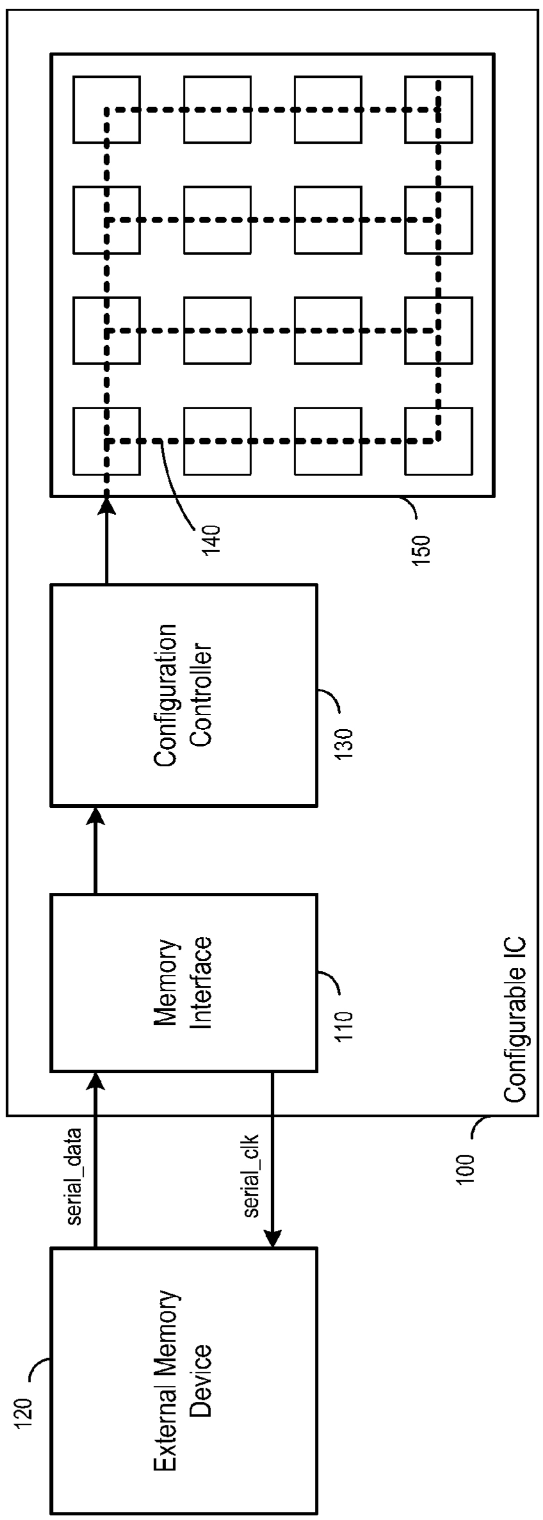
FIG. 1 illustrates an example of a configurable IC that includes a memory interface module for retrieving configuration data from an external memory device.

Some embodiments provide a memory interface module in an IC that includes one or more configurable circuits. The memory interface module is for retrieving configuration data for configuring the configurable circuits from an external memory device. The configurable circuits in the IC can be configured to perform different functions according to different sets of configuration data. Such an IC is sometimes referred to as a configurable IC. FIG. 1 illustrates an example of a configurable IC 100 that includes a memory interface module 110 for retrieving configuration data from an external memory device 120. As shown in this figure, the memory interface 110 retrieves configuration data from the external memory device 120 and delivers the data to a configuration controller 130. The configuration controller 130 in turn uses the configuration data to configure one or more configurable circuits via a configurable network 140. In some embodiments, some or all of the configurable circuits are in a fabric 150 of configurable circuits.

The external memory device 120 from which the configurable IC 100 retrieves data is a stand alone memory component that is physically outside of the IC. In some embodiments, the external memory device 120 is a flash memory device, and in some of these embodiments, the flash device is a serial peripheral interface (SPI) compliant device that can be accessed via a set of clock and data pins. One of ordinary skill would recognize that other non-volatile memory devices such as EEPROMs can also be used to store configuration data for retrieval by the configurable IC 100. In some embodiments, any memory or storage device such as SRAM, DRAM that produces data based on a strobe signal from the IC can be used.

The configurable IC 100 accesses the external memory device 120 using a set of clock and data pins. In some embodiments, the set of clock and data pins include a serial data pin (serial_data) and a serial clock pin (serial_clk), where the memory device provides one bit of serial data for retrieval by the configurable IC 100 for each clock cycle on the serial clock pin. The data retrieval operation will be further described by reference to FIG. 6 below. For some embodiments that use a SPI compliant flash part as the external memory device 120, the serial data pin and the serial clock pin are mapped to the MISO and SCK pins of the SPI interface respectively. In some embodiments, the serial data pin is mapped to one of the data pins of a multiple-bit data bus. In some other embodiments, the serial clock is replaced by one or more memory access strobe signals, which also cause data to be read out of the external memory device 120.

The memory interface module 110 is a module within the configurable IC 100. The configurable IC 100 uses the memory interface 110 to retrieve configuration data from the external memory device 120. The memory interface module 110 retrieves data from the external memory device 120 by sourcing the serial clock to the external memory device and samples the serial data pin from the external memory. Since the serial clock is used to sample the retrieved data, the serial clock is also referred to as the sampling clock in some embodiments.

The memory interface module 110 delivers the sampled data to other parts of the IC, and in some embodiments, the sampled data is delivered to the configuration controller 130 as configuration data for configuring the configurable circuits in the IC. Some embodiments include the memory interface module 110 within the configuration controller 130. The operations of the memory interface module will be further described by reference to FIGS. 2-13 below.

The configuration controller 130 receives the configuration data that is retrieved by the memory module from the external memory device. The configuration controller 130 uses the configuration data to configure the configurable circuits of the IC. In some embodiments, the configurable ICs are in the fabric 150, where the configurable ICs receive configuration data from the configuration network 140. Some embodiments of the configuration controller will be described further by reference to FIG. 14 below. Further examples of configuration controllers and configuration networks can be found in U.S. Pat. No. 7,375,550.

II. MEMORY INTERFACE

Figure 2:
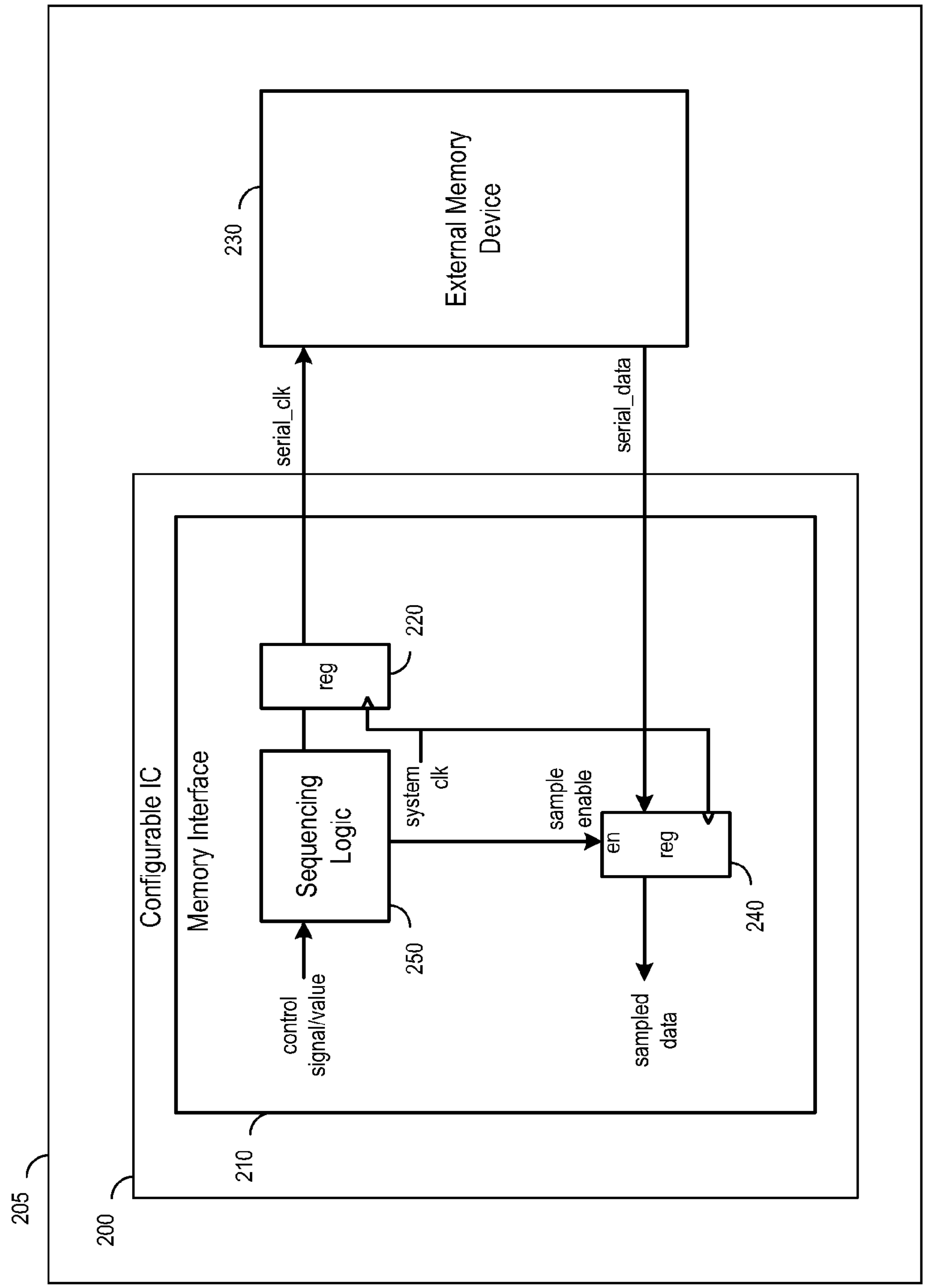
FIG. 2 illustrates an example of a memory interface module in a configurable IC.

For some embodiments, FIG. 2 illustrates an example of a memory interface module 210 in a configurable IC 200. The memory interface module 210 includes a sequencing logic 250, a serial clock sourcing register 220, and a sampling register 240. As illustrated in FIG. 2, the memory interface module 210 operates on a system clock and provides a serial clock signal to the external memory device 230. The serial clock is sourced from a clock sourcing register that operates on the system clock. The external memory device 230 uses the serial clock to produce data on the serial data pin. One bit of data is retrieved when the memory interface module 210 samples the serial data pin.

In some embodiments, the configurable IC 200 and the external memory 230 are part of an electronic system 205. In some embodiments, the electronic system 205 is a standalone electronic device, such as a computer, a network device (e.g., a switch or a router), a multimedia player, a mobile phone, a PDA, or other consumer electronic products. In some embodiments, the electronic system 205 includes other components, such as one or more processors, a network interface (e.g., a network card), a mass storage device or other devices.

For some embodiments, the data retrieved from the external memory device can transition any time during a system clock cycle. In order to more accurately record transitions on the data pin, some embodiments detect transitions by using both rising and falling edges of the system clock. In some embodiments, a data transition that is captured by the rising edge of the system clock is referred to as a full-cycle transition, while a data transition that is capture by the falling edge of the system clock is referred to as a half-cycle transition. Some embodiments, on the other hand, define a full-cycle transition as a transition that takes place at the beginning or end of a cycle and a half-cycle transition as a transition that takes place in the middle of a system clock cycle.

The sequencing logic 250 provides the input to the serial clock sourcing register 220 and the sampling pulse (sample enable) to the sampling register 240. In some embodiments, the sequencing logic 250 operates on the system clock and generates signals that are synchronous to the system clock. In some embodiments, the sequencing logic 250 receives control signal/value bits from outside of the memory interface module 210. Examples of such control bits include control bits that determine the frequency of the serial clock, the duty cycle of the serial clock, the number of system clock cycles per serial clock, and the position of the sampling pulse relative to the start of the serial clock cycle. In some embodiments, these control signal/value bits also include half-cycle adjustment signals. In some embodiments, these control bits can originate from within the configurable IC (e.g., 200) or from a computing device outside of the configurable IC. In other embodiments, some or all of the control signals are generated within the sequencing logic 250 by mechanisms such as microcontrollers running a firmware or by finite state machines. In some embodiments, the sequencing logic 250 can be implemented according to the example described by reference to FIG. 8 below.

The serial clock sourcing register 220 sources the serial clock signal to the external memory device 230. In the example illustrated in FIG. 2, the sequencing logic 250 provides the input to the serial clock sourcing register 220 for the register to generate the serial clock. The input provided by the sequencing logic 250 is clocked over using the system clock, so the serial clock produced by the serial clock sourcing register 220 is synchronous to the system clock. In some embodiments, the characteristic of the serial clock is determined by the control bits received by the sequencing logic 250 (e.g., duty cycle, frequency/period). In some of these embodiments, the serial clock is characterized by the number of system clock cycles in which the serial clock is at logic high or logic low. The serial clock is thus also referred to as the derived clock in some embodiments because it is derived from the system clock.

The sampling register 240 samples the serial data pin whenever a sampling pulse (sample enable) is received from the sequencing logic 250. The sampling register 240 holds the sampled data and makes it available for the rest of the IC (e.g., as retrieved configuration data) until it receives the next sampling pulse. In some embodiments, the data sampling register 240 does not directly sample the serial data at the serial data pin, but instead samples a registered version of the serial data signal. In some of these embodiments, the serial data goes through one or more stages of pipeline registers before reaching sampling register 240. In some embodiments, these pipeline registers are for resolving possible metastability caused by transitions of the serial data signal that are too close to edges of the system clock.

In some embodiments, the sequencing logic 250, the serial clock source register 220, and the sampling register 240 all operate on the system clock or clocks derived from the system clock (such as the serial clock). In these embodiments, the timing of the data retrieval operation is deterministic with respect to the system clock, which is both used to generate the serial clock and to sample the retrieved data. In the example illustrated in FIG. 2, the falling edge of the serial clock causes the external memory device 230 to produce retrieved data, and the retrieved data arrives at the sampling register 240 ahead of the system clock edge that clocks in the serial data (i.e., the system clock edge that coincides with the sampling pulse).

Figure 3:
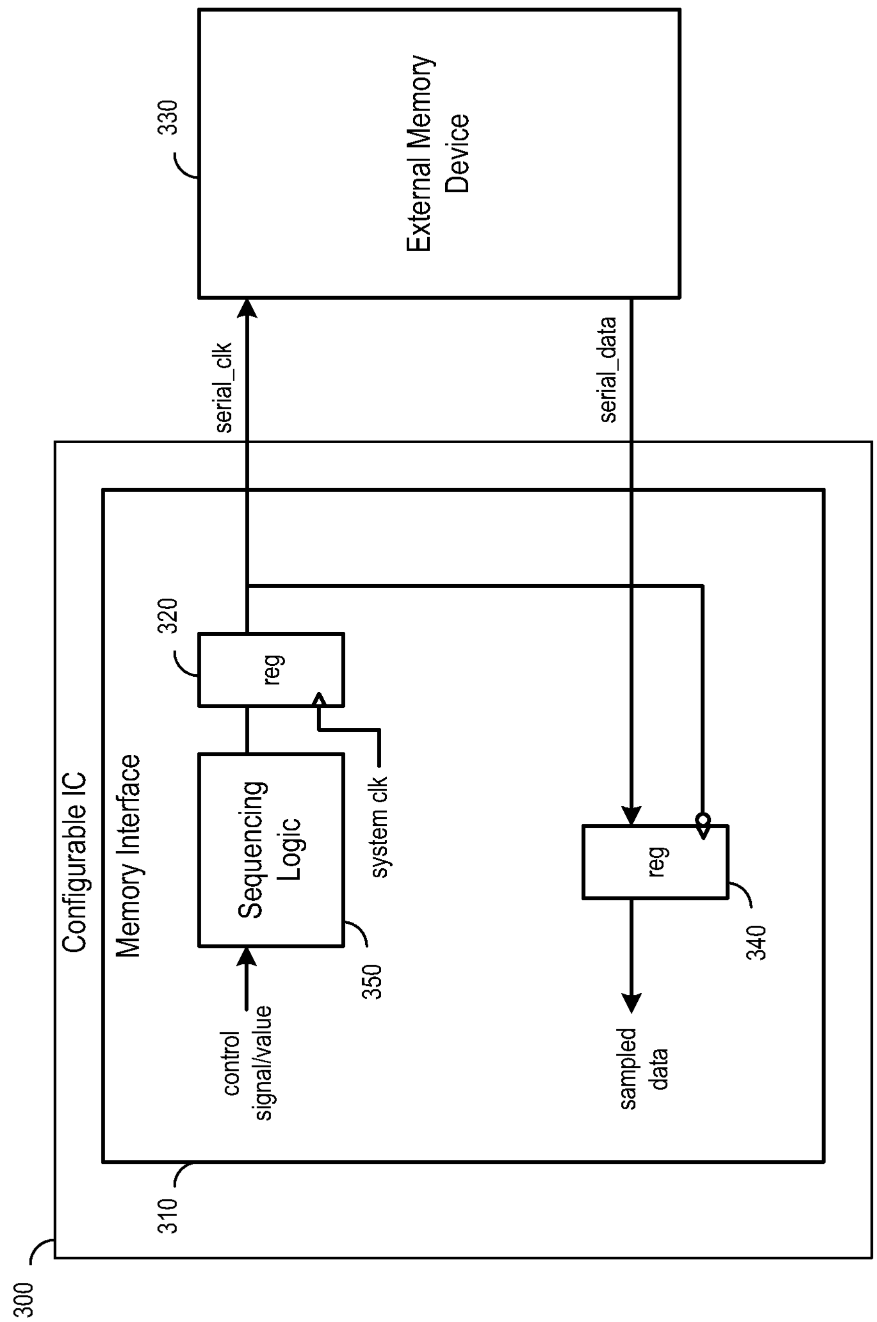
FIG. 3 illustrates an example of an alternative sampling register in a memory interface module of configurable IC.

Rather than operating directly on the system clock, some other embodiments use the serial clock to operate the sampling register. FIG. 3 illustrates an example of such an alternative sampling register 340 in a memory interface module 310 of configurable IC 300. Similar to the configurable IC 200 of FIG. 2, the configurable IC 300 also includes a sequencing logic 350, a serial clock sourcing register 320 and a sampling register 340. However, unlike the sampling register 240 of the IC 200 which operates using the system clock, the sampling register 340 operates on the serial clock. The sampling register 340 samples the data on the falling edge of the serial clock rather than using a sampling enable pulse. In the example illustrated in FIG. 3, the external memory device 330 produces the retrieved data after it has received the falling edge of the serial clock, and the retrieved data arrives at the sampling register 340 ahead of the next falling edge of the serial clock by the register's setup time requirement. Throughout this specification, the falling edge of serial clock will be referred to as the clock edge that is used to retrieve and sample serial data, but one of ordinary skill in the art would recognize that in some embodiments, the rising edges of the serial clock is used for retrieving and sampling instead of the falling edge.

Figure 4:
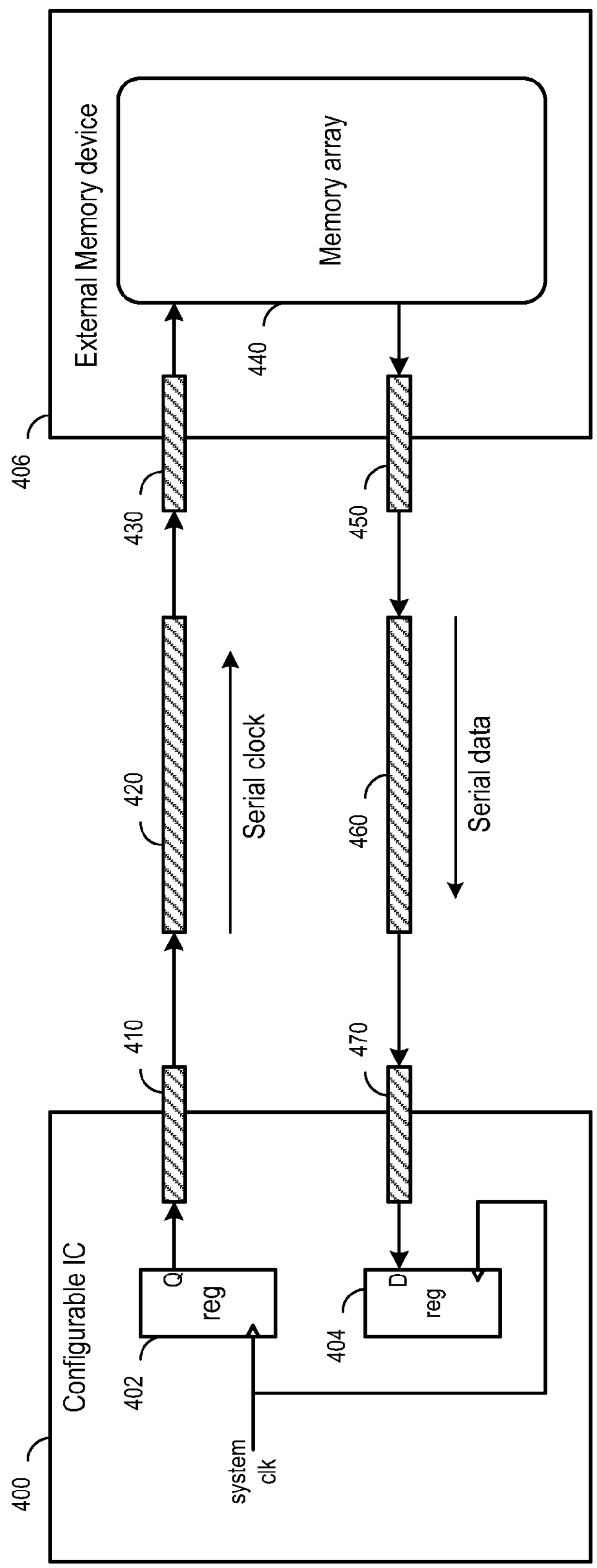
FIG. 4 illustrates an example of a signal path and the delay elements between a serial clock sourcing register and a serial data sampling register.

The time between the clock edge that sources the serial clock and the clock edge that samples the serial data is sometimes referred to as a timing budget. Some embodiments select a timing budget that is large enough to accommodate the delay from the system clock at the sourcing register 220 (or 320) and back to the sampling register 240 (or 340). FIG. 4 illustrates an example of the signal path and the delay elements between the serial clock sourcing register 402 and the serial data sampling register 404. As illustrated in FIG. 4, serial clock originates from serial clock sourcing register 402 with a clock to Q delay from the system clock. The signal then traverses through delay element 410, which in some embodiments represents the delays across output drivers, I/O pads, bonding wires, balls or other electrical/physical components between register 402 and a signal path external to the IC 400. The serial clock signal next propagates through delay element 420, which in some embodiments represents electrical paths and components along a signal path on a printed circuit board from the IC 400 to the memory device 406. In some embodiments, the delay element 420 also includes delays that are caused by crosstalk or other interferences from other electrical components in the system. The serial clock next propagates through delay element 430, which in some embodiments represents delays across bonding wires, balls, I/O pads, input buffers and other electrical components that may cause delay between a signal path external to the memory device 406 and the memory array 440.

The signal that arrives at memory array 440 causes the memory array 440 to produce a data at its output port after a certain amount of delay. The data produced by the memory array 440 then propagates through delay element 450, which represents delays across output drivers, I/O pads, bonding wires, balls and other electrical components that may cause delay between the output port of the memory array 440 and an external signal path. The serial clock signal next propagates through delay element 460, which in some embodiments represents electrical paths and components along a signal path on a printed circuit board from the memory device 406 to the IC 400. In some embodiments, the delay element 460 also includes delays that are caused by crosstalk or other interferences from other electrical components in the system. The data signal next traverse through delay element 470, which in some embodiments represents delays across bonding wires, balls, I/O pads, input buffers and other electrical components that may cause delay between a signal path external to the IC 400 and the sampling register 404. In some embodiments, delay element 470 also includes the delay of one or more stages of pipeline registers.

In some embodiments, the delay characteristics of the delay elements in FIG. 4 cannot be precisely specified for various reasons. For example, identically specified electrical components are subject to variations in manufacturing conditions; once a system is built and in operation, temperature and noise can also cause the delay characteristics of the delay elements to be uncertain; signals propagating through each electrical path are subject to interference by signals propagating through other electrical paths; and different patterns/sequences of signals for a given signal path may result in different responses by different parasitic capacitances. When delay characteristic of a delay element cannot be precisely specified, some embodiments use a range of uncertainty to express delay (e.g., 5.2 ns to 5.4 ns, or 5.3±0.1 ns). Within the range of uncertainty of a delay element, it is unknown or uncertain whether the signal has completely propagated across the delay element.

Figure 5:
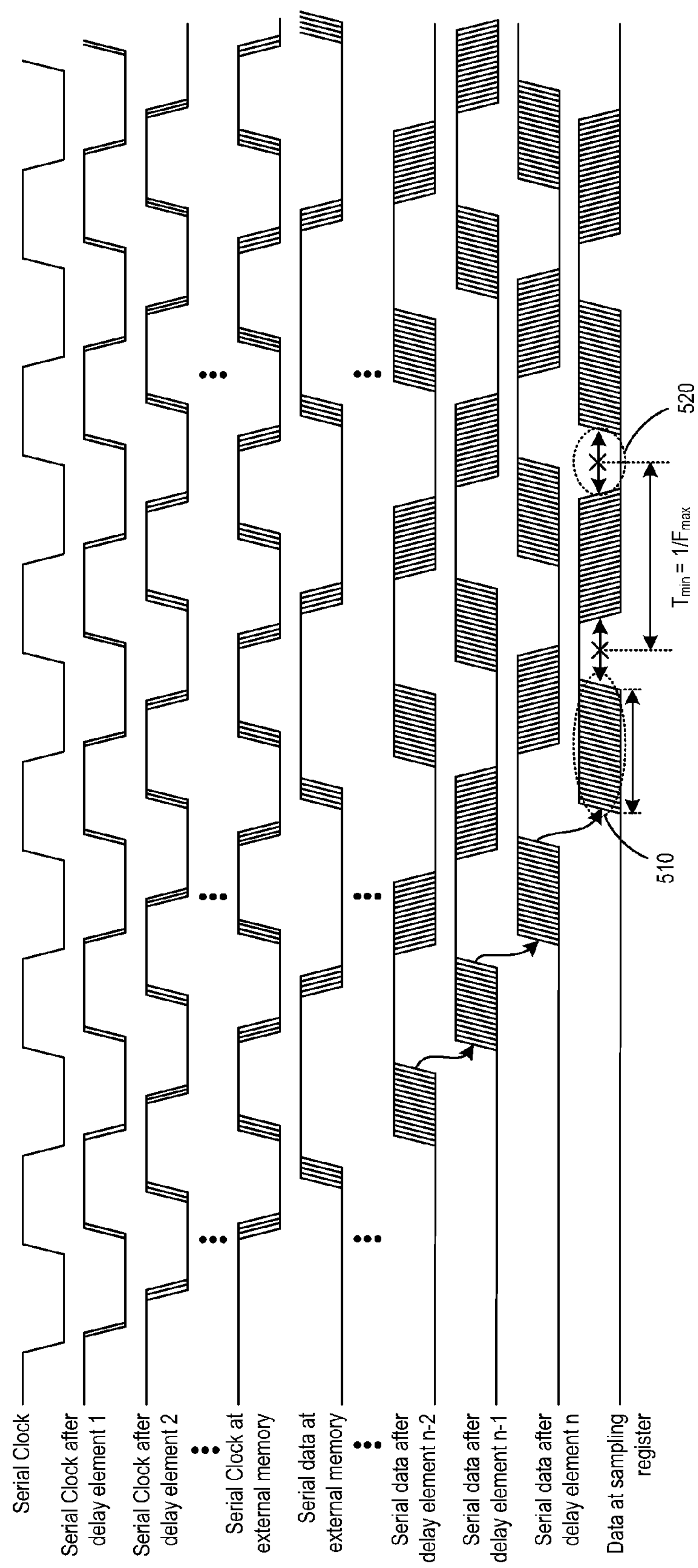
FIG. 5 illustrates an example for a memory interface that uses uncertainty information to determine a frequency of a serial clock and/or a timing of the sampling pulse.

Some embodiments use uncertainty information to determine the frequency of serial clock and/or the timing of the sampling pulse. FIG. 5 illustrates such an example for a memory interface described earlier by reference to FIGS. 2 and 4. As illustrated in FIG. 5, the serial clock signal as originated has none or very little delay uncertainty (clock to Q delay within the IC). As the signal propagates from delay element to delay element (i.e., from delay element 1 to delay element 2, etc.), the uncertainty of the earlier delay element causes the later delay elements to receive signals with uncertain timing. The later delay element, in turn, adds to the uncertainty in timing when it propagates the signal. By the time the signal arrives at the sampling register, the uncertainties of timing delay can accumulate to a worst case uncertainty interval (e.g., interval 510). Some embodiments regard data arrived at the sampling register during the uncertainty interval as invalid.

In order to ensure that the data sampled is valid, some embodiments sample data only in the intervals of valid data between intervals of data uncertainty. These intervals of valid data are sometimes referred to as "eyes" (e.g., the interval 520). It is often desirable to increase the frequency of the serial clock in order to increase the speed of data retrieval. However, as the frequency of serial clock increases and the period of the serial clock decreases, less of each serial clock period remains available as "eyes". In order to ensure that the "eyes" are wide enough for valid sampling of retrieved data from external memory, some embodiments determine an optimal serial clock frequency based on the duration of the worst case uncertainty interval and a desired width of the "eyes".

III. OPTIMIZING FREQUENCY AND SAMPLING POINT

Figure 6:
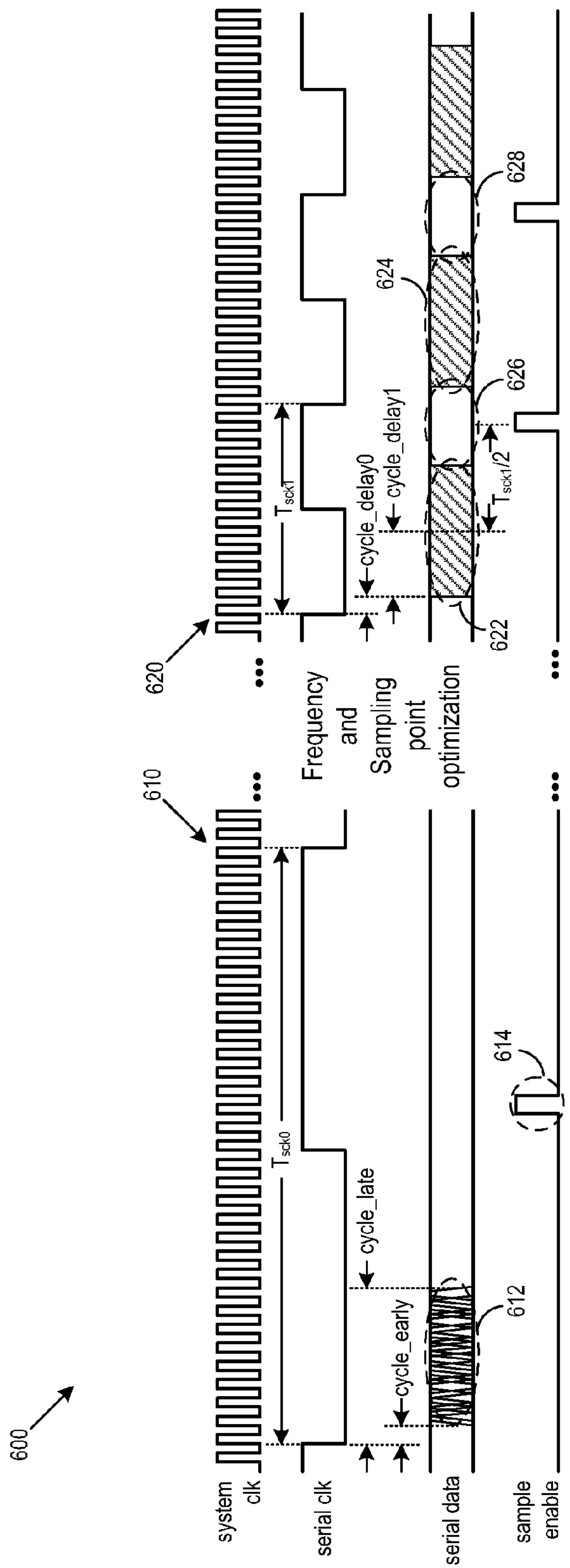
FIG. 6 illustrates a timing diagram of an example operation for optimizing serial clock frequency and sampling point.

Some embodiments facilitate the determination of an optimal serial clock frequency and an optimal sampling point. For some embodiments that include a memory interface module, FIG. 6 illustrates a timing diagram of an example operation for optimizing serial clock frequency and sampling point. In two stages 610 and 620, the timing diagram shows system clock (system clk), serial clock (serial clk), serial data (serial data) and sampling pulse (sample enable) before and after the optimization operation. The optimization operation will be described by reference to FIG. 7 below. As discussed above, the falling edge of the serial clock causes the external memory to produce the serial data after a delay with some uncertainty, and the serial data is sampled at the sampling point when the sample enable pulse is asserted.

The first stage 610 is the stage before optimization. In this stage, the serial clock has an initial period of $T_{sck0}$ that is large enough to guarantee that the serial data will become certain after an interval of uncertainty and that the intervals of uncertainty do not overlap each other. Also in the stage 610, some embodiments select the timing of the sampling pulse to be far away from the falling edge of serial clock (or whichever edge is used to retrieve data from external memory) in order to ensure that only valid data is sampled. In some of these embodiments, the position of the sampling pulse 614 at this stage is based on the rising edge of the serial clock. In some other embodiments, the memory interface does not relay retrieved data to other parts of the IC prior to frequency and sampling point optimization, and therefore does not set a time for sampling the serial data during the first stage 610.

The uncertainty interval 612 on the serial data pin is an interval during which the serial data signal received from the external memory may transition from one signal level to another. In order to ascertain the position and the duration of the uncertainty interval, some embodiments capture these transitions by using the system clock and reporting the earliest and latest captured transitions. Some embodiments of the transition capturing and recording operation will be further described by reference to FIGS. 8 and 9 below. Some of these embodiments use the earliest transition (cycle_early) and the latest transition (cycle_late) to perform optimization of frequency.

The second stage 620 is the stage after optimization. In this stage, the serial clock frequency $F_{sck1}$ is set to retrieve data from the external memory at the highest rate possible. This new serial clock frequency also corresponds to a new optimized serial clock period $T_{sck1}$ that is large enough to ensure that the intervals of data validity (e.g., eyes 626 and 628 between periods of uncertainty 622 and 624) have sufficient width for sampling. Also at the second stage 620, the sampling pulse is set to a new sampling point that is safely within the interval of data validity. In some embodiments, this new sampling point is set at $T_{sck1}/2$ away from the center of the uncertainty interval.

Figure 7:
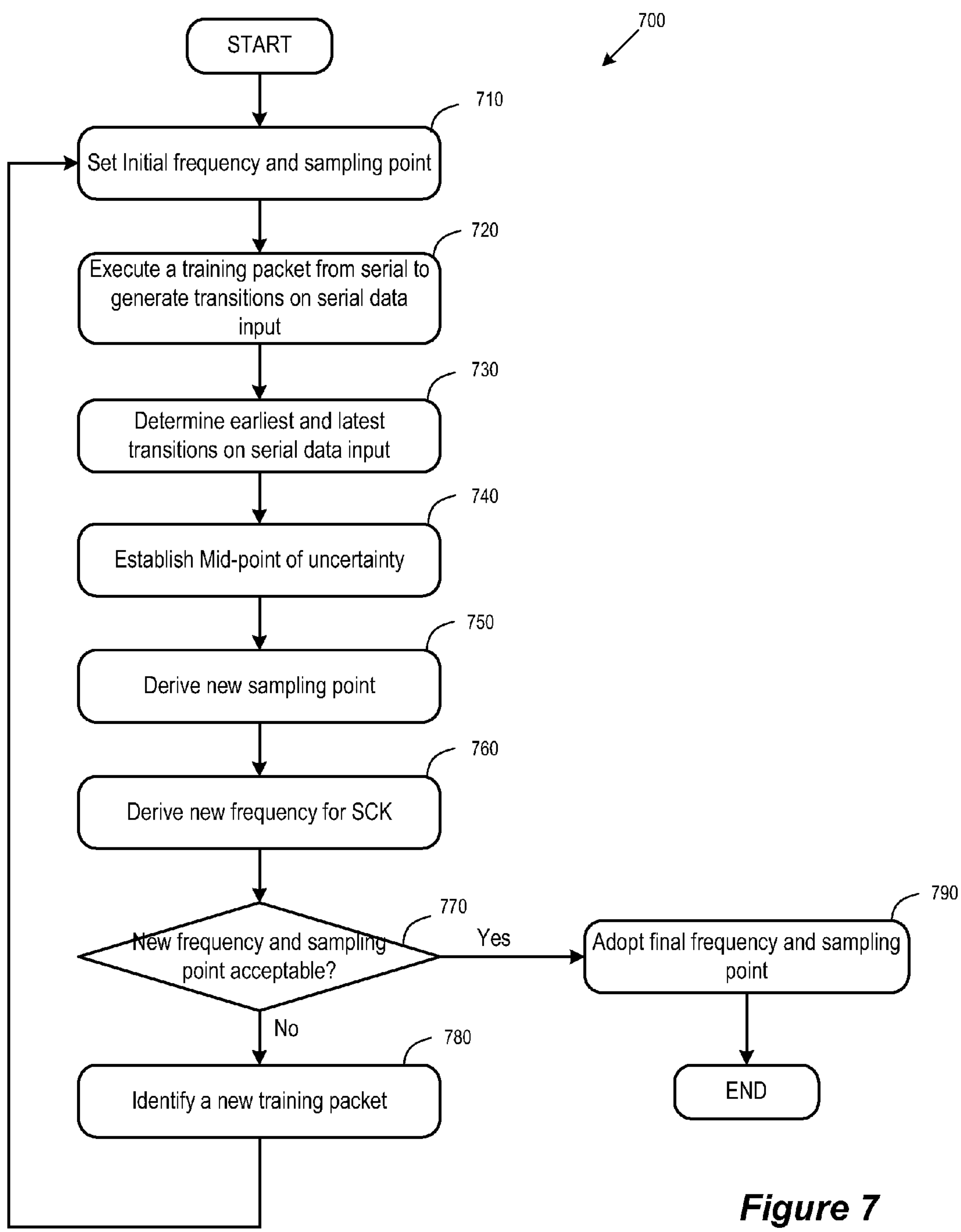
FIG. 7 conceptually illustrates a process that is used to optimize a serial clock frequency/period and a sampling point.

For some embodiments, FIG. 7 conceptually illustrates a process 700 that is used to optimize the serial clock frequency/period and the sampling point. The process 700 starts when the IC receives an instruction to perform automatic optimization of the memory interface. In some embodiments, the IC receives this instruction from application software running on a host computing device. Some embodiments have the IC generate this instruction automatically as part of a power-on/reset sequence. For some embodiments that include the memory interface as part of a configurable IC, the process 700 starts when the configurable IC is preparing to load a set of configuration data from the external memory device.

At 710, the process sets an initial frequency and sampling point. In some embodiments, the initial frequency and sampling point are set as part of the power-on/reset default values. In some other embodiments, these values are set by firmware or by software running on a host computing device. As discussed above by reference to FIG. 6, some embodiments set the initial frequency and sampling point so to guarantee that the serial data will become certain after an interval of uncertainty and that the intervals of uncertainty would not overlap each other.

Next at 720, the process runs a training packet from the external memory to generate transitions on the serial data input. In some embodiments, the external memory stores one or more training packets. A training packet includes information that causes serial data pin to transition between signal levels. In some embodiments, the information in the training packet causes the serial data pin to transition randomly based on a randomly generated sequence of bits. In some embodiments, the sequence of bits is deliberately chosen to test possible corner cases for detecting the widest possible range of uncertainty. In some embodiments, the training packets are chosen to generate the most number of consecutive transitions (e.g., 0x5555 or 0xaaaa). In some embodiments, the training packets are chosen to test the effects of parasitic electrical elements on timing delays. For example, in some embodiments, the data in the packet forms periodic signals of particular frequencies.

The process next determines (at 730) the earliest and latest transitions on the serial data input within each cycle of the serial clock. Some embodiments examine each transition and determine whether the transition is the earliest transition or the latest transition on the serial data with respect to the falling edge of the serial clock. In some of these embodiments, the process reports the position of the earliest transition and the latest transition in terms of number of system clock cycles from the falling edge of the serial clock. In some embodiments, the process further determines whether the transition occurs on the rising edge or the falling edge of the system clock. The operation for determining the earliest and the latest transition will be further described by reference to FIGS. 8 and 9 below.

Having determined the earliest and latest transitions, the process next establishes (at 740) the midpoint of the uncertainty interval. In some embodiments, the midpoint of the uncertainty interval is determined by calculating the midpoint between the detected earliest and latest transitions. In some embodiments that use both rising edges or falling edges of the system clock to capture and record transitions, the calculation of the midpoint is further adjusted by examining whether the earliest and/or the latest transition are at half cycle (falling edge of system clock) or full-cycle (rising edge of system clock), and whether there is an odd or even number of system clock cycles between the earliest and latest transition. The operation that determines the midpoint of the uncertainty interval will be further described below by reference to FIGS. 10 and 11.

The process 700 next determines (at 750) a new sampling point. In some embodiments, the new sampling point is determined using the midpoint of uncertainty determined at 740. Some embodiments select a sampling point that is sufficiently separated from the uncertainty interval so the sampling of data would not take place while the data is uncertain. Some of these embodiments also select this point to be as close to the uncertainty interval as possible so the sampling takes place at the earliest possible point in the serial clock cycle at which the sampled data will be valid. In some embodiments, this sampling point corresponds to the center of the eye of valid data as discussed above by reference to 520 of FIG. 5.

Figure 12:
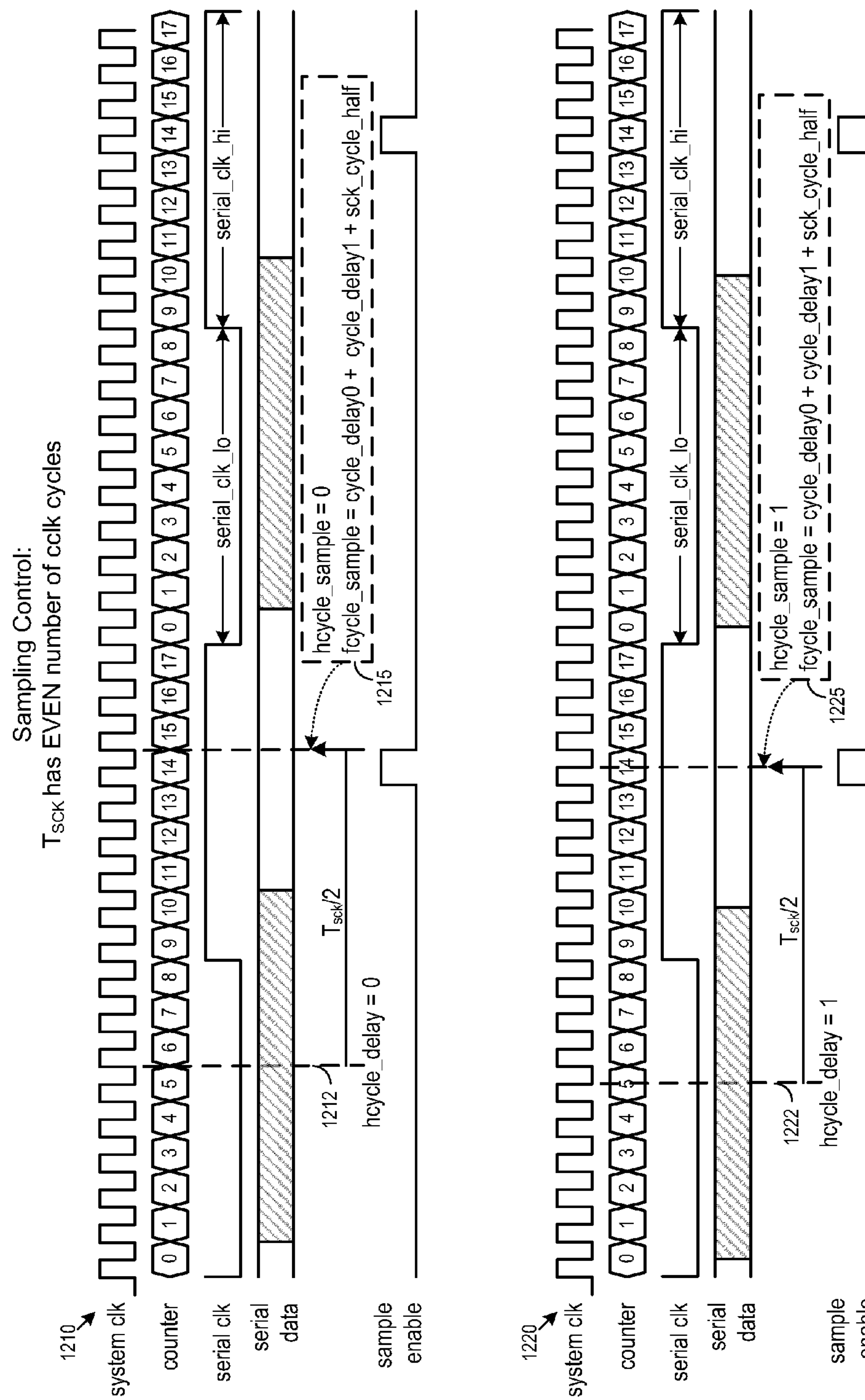
FIGS. 12-13 illustrate an example of an identification of a sampling point at half-cycle granularity.
Figure 13:
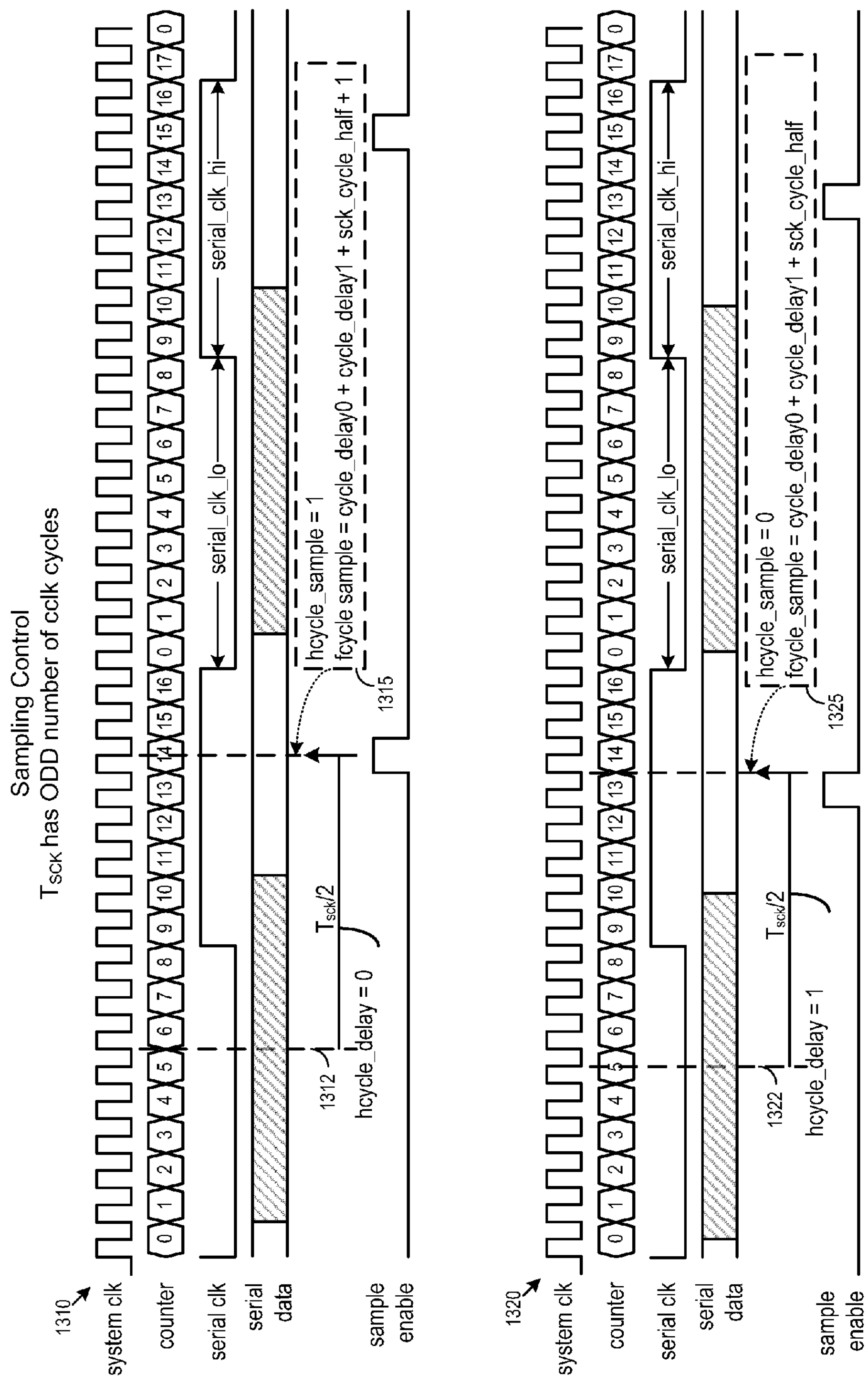

In order to determine the sampling time at a finer granularity, some embodiments determine the new sampling point to the nearest half cycle or full cycle of the system clock. In some of these embodiments, whether the midpoint of the uncertainty falls on a falling edge or a rising edge and whether there is an odd or even number of system clock cycles in a serial clock cycle are used to determine the position of the sampling point. FIGS. 12 and 13 below further describes the operation that determines the sampling point of the serial data.

The process 700 next determines (at 760) a new frequency for the serial clock. In some embodiments, the frequency is determined based on a detected interval of uncertainty as earlier described for step 730 of the process. Some embodiments use the detected interval of uncertainty to establish a new, shorter serial clock period that leaves sufficient intervals of valid data for sampling (i.e., the "eye" as discussed above by reference to 520 of FIG. 5). Some embodiments use the interval between the midpoint of uncertainty determined at 740 and the sampling point determined at 750 to determine the new frequency. For example, some embodiments set the new frequency of the serial clock to correspond to a period that is at least twice as wide as the interval between the midpoint of uncertainty and the sampling point.

In some other embodiments, the process 700 determines the new serial clock frequency before determining the sampling point. In some of these embodiments, the new sampling point is based on adding half of the serial clock period (determined in step 760) to the midpoint of uncertainty (determined at step 740), since this is the point in a serial clock cycle that is farthest away from invalid data due to uncertainty.

In some embodiments, further adjustments are made to the newly derived serial clock frequency by examining the factors that may contribute to timing uncertainty. These factors may include the temperature of the system, the uncertainty of components as specified by manufacturers, the quality of the training pattern in the training packet, the level of interference from other signal paths or electrical components in the system, and the granularity of the samples, etc. In some embodiments, at least some of these factors are evaluated in real-time while the process 700 is in progress. For example, the level of interference can be evaluated by measuring the amount of signal/data traffic on the system. In some embodiments, the process evaluates the worst case uncertainty interval by determining and summing the timing uncertainties of individual delay elements. Some embodiments identify specific factors of uncertainty that are not represented in the detected interval of uncertainty and place more emphasis on these factors when calculating the adjustment to the serial clock frequency. Some embodiments add additional margins to account for factors that may impact timing uncertainties but are not specifically known or contemplated.

In some embodiments, software or firmware running on a computing device determines the new serial clock frequency. This computing device may be a processing module on the same IC as the memory interface, or in a host computer that is controlling the system. In some embodiments, the computing device controls serial clock frequency by control values/signals. In some of these embodiments, the control values/signals specify the number of system clock cycles that the serial clock is at logic low and the number of system clock cycles that the serial clock is at logic high.

Next, at 770, the process determines whether the new frequency and the new sampling point are acceptable. In some embodiments, the process determines the acceptability of the new frequency and sampling point by continuing to examine the transitions on the serial data pin using the newly derived frequency and sampling point. Some embodiments reject the newly derived frequency and sampling point if the transitions detected under the new frequency and sampling point indicate that the interval of valid data ("eye") is too small or non-existent (e.g., if transitions are detected beyond the previously determined interval of uncertainty).

Some embodiments make this determination by examining the uncertainty factors and the patterns in the training packet. If the training packet was considered inadequate in light of the evaluated uncertainty factors, or if the earliest transition, the latest transition and the midpoint of the uncertainty are considered too unreliable for other reasons, some embodiments would deem the new frequency and the new sampling point unacceptable. If the process 700 deems the new frequency and new sampling unacceptable, it proceeds to 780. If the new frequency and sampling point is considered acceptable, the process proceeds to 790.

At 780, the process 700 identifies a new training packet in order to record a new earliest transition and a new latest transition. The new training packet can be a subsequent packet in the memory device. In some embodiments, the process may select the original training packet and repeat steps 710 to 760. In some embodiments, the selection of the new training packet is adaptively determined based on captured uncertainties or other factors, such as temperature or other environmental data that the system controlling software or firmware is privy to. Based on these same factors, some embodiments compose a new training packet instead of selecting a pre-defined packet that is stored in the memory device. After identifying a new training packet, the process returns to 710 to once again capture and record transitions on serial data pin.

At 790, the process 700 adopts the newly derived serial clock frequency and serial data sampling point for further operations with the external memory. The process 700 then ends.

IV. EXEMPLARY EMBODIMENTS

For some embodiments, FIG. 8 illustrates an example implementation of the memory interface module 210 as described earlier by reference to FIG. 2. Specifically, FIG. 8 illustrates an example memory interface module 800 that (i) generates the serial clock and (ii) samples the serial data. The example memory interface module 800 also facilitates the process described above by reference to FIG. 7. Specifically, some embodiments use the example memory interface module 800 to (i) record earliest and latest transitions (performed by 730), (ii) establish the midpoint of uncertainty (performed by 740) and (iii) derive the new sampling point (performed by 760).

The memory interface module 800 includes several modules: a training module 810 for recording the earliest and latest transitions, an uncertainty midpoint module 820 for establishing midpoint of uncertainty, a sampling control module 830 for controlling sampling of serial data, and a clock divider 840 for generating a serial clock. The memory interface module 800 also includes a number of discrete logic components: rising edge pipeline registers 850 and 852, a full-cycle transition detecting register 854, a full-cycle transition detecting logic 856, falling edge pipeline registers 860 and 862, a falling to rising edge synchronization register 864, a half-cycle transition detecting logic 866, a half-cycle sample selection multiplexor 870, and a sampling register 880.

The rising edge pipeline registers 850 and 852 clock in serial data on rising edges of the system clock and the falling edge pipeline registers 860 and 862 clock in serial data on falling edges of the system clock. Some embodiments use the pipeline registers to resolve metastability that may arise when transitions on the serial data pin are too close to edges of the system clock. Some other embodiments use three or more pipeline registers for both rising and falling edges instead of only two as illustrated in FIG. 8.

The last of the rising edge pipeline registers, 852 sends its output to the full-cycle transition detecting register 854 for detecting full-cycle transitions. A full-cycle transition is detected when two consecutive rising edges of the system clock capture different logic levels from the serial data pin. When such a transition occurs, the output of the pipeline register 852 and the output of the full-cycle detecting register 854 will be different, and the difference will be detected by the full-cycle transition detecting logic 856. In some embodiments, the full-cycle transition detecting logic 856 is based on an exclusive-or gate.

The last falling edge pipeline register 862 sends its output to the falling to rising edge synchronization register 864 for detecting half-cycle transitions and for synchronizing output of falling edge pipeline register 862 to the rising edges of the system clock. The output of the synchronization register 864 is compared with the output of the full-cycle transition detecting register 854. A transition on serial data that occurs between a rising edge and the immediate next falling edge will cause the output of registers 854 and 864 to be different, and the difference will be detected by the half-cycle transition detecting logic 866. On the other hand, a transition that is between a falling edge and the immediate next rising edge will not be detected by this circuitry. In some embodiments, the half-cycle transition detecting logic 866 is based on an exclusive-or gate.

For embodiments that implement transition detection circuitry such as 850-868, a detected full-cycle transition at 856 is a transition that occurs on serial data one rising edge ago, while a detected half-cycle transition at 866 is a transition that occur on serial data two falling edges ago. A detected half-cycle transition is thus a transition that is one half-cycle earlier than a detected full-cycle transition. Consequently for some embodiments, a half-cycle adjustment signal (e.g., hcycle_sample, hcycle_early, hcycle_late and hcycle_delay) represents an offset that is half of a system clock cycle earlier, i.e., at the immediate preceding falling system clock edge.

The full-cycle transition detection signal at 856 and the half-cycle transition detection signal at 866 are sent to the training module 810 for recording the earliest and latest transitions. In some embodiments, the half-cycle transition signal (e.g., hc_transition) and the full-cycle transition signal (e.g., fc_transition) are OR'ed together by a logic gate 868 to produce a combined transition signal (e.g., transition) for the training module 810. In these embodiments, a transition detected by the rising edge of system clock would result in assertion of fc_transition but not hc_transition, while a transition detected by the falling edge of system clock would result in assertion of both fc_transition and hc_transition. In other embodiment, the roles of the falling edge and rising edge reverse, where full-cycle transitions are captured by falling edges and half-cycle transitions are captured by rising edges.

The training module 810 uses the detected transitions to determine the earliest transition and the latest transition in a timing uncertainty interval. It receives full-cycle and half-cycle transition indications from the transition detection logics 856 and 866. It receives indications for the start of a training packet (e.g., start_packet) and the end of a training packet (e.g., end_packet). In some embodiments, the start and end of packet indications are given by a software or firmware application that controls the frequency/sampling point optimization process. The training module 810 further receives indications for the start of a new serial clock cycle (e.g., new_bit) from the sampling control module 830. The training module uses these signals to determine the position of the earliest and latest transitions on the serial data and thereby determine the interval of uncertainty. The training module also uses these signals to determine whether the earliest transition and/or the latest transition are half-cycle transitions or full-cycle transitions. The operation of determining the position of the earliest and latest transitions will be further described by reference to FIG. 9 below. The position of the earliest and latest transitions (e.g., cycle_early, cycle_late) and indications of whether these transitions are half-cycle or full-cycle transitions (e.g., hcycle_early, hcycle_late) are sent to the uncertainty midpoint module 820.

The uncertainty midpoint module 820 is for establishing the midpoint of the uncertainty interval. The position of the midpoint is needed by the sampling control module 830 for determining the optimal sampling point for serial data. From the training module 810 the uncertainty midpoint module receives the position of the earliest and latest transitions as well as the indications of whether these transitions are half-cycle or full-cycle transitions. Based on these signals, the uncertainty midpoint module calculates and reports the position of the midpoint (e.g., cycle_delay1). In some embodiments, the uncertainty midpoint module reports the midpoint of uncertainty to the nearest half-cycle by indicating whether the midpoint is on the rising edge or on the falling edge (e.g., hcycle_delay). The operation of determining the midpoint to the nearest half-cycle will be further described by reference to FIGS. 10 and 11 below. In some embodiments, the functionality of the uncertainty midpoint module is implemented by software. In these embodiments, the software reads the output of the training module and generates the output of the uncertainty midpoint module.

The clock divider module 840 produces the serial clock by dividing down the system clock. In some embodiments, the serial clock signal is based on a counter that increments on system clock. In some of these embodiments, the clock divider receives a pair of control values that determine the number of clock cycles during which serial clock is at logic high (e.g., serial_clk_hi) and the number of clock cycles during which the serial clock is at logic low (e.g., serial_clk_lo). In some embodiments that use falling edge of serial clock as the active edge to retrieve data from the external memory, the serial clock is at logic low when the counter value is less than serial_clk_lo and logic high when the counter value is equal to or greater than serial_clk_lo. The counter in some of these embodiments returns to zero when counter value reaches the sum of serial_clk_hi and serial_clk_lo.

The clock divider module in some embodiments also includes a serial clock sourcing register as described earlier by reference to 220 of FIG. 2. In these embodiments, the serial clock is directly sourced by the Q output of a register with minimal delay from the system clock.

The sampling control module 830 controls the sampling of the serial data. In some embodiments, the sampling control module receives a counter value from clock divider 840. The counter value is used to mark the start of a new serial clock cycle (e.g., new_bit) for the training module 810. The counter value is also used to generate the sampling pulse (sample enable).

The sampling control module 830 generates the sampling pulse by comparing the counter value received from the clock divider 840 with a set of sampling control values. This set of sampling control values may include the position of the start of the uncertainty period (e.g., cycle_delay0), the midpoint of uncertainty (e.g., cycle_delay1), and the value of half of the serial clock cycle (e.g., sck_cycle_half). In some embodiments, some or all of these sampling control values are expressed in terms of number of clock cycles. In some of these embodiments, the set of sampling control values also include an indication of whether the midpoint of uncertainty is on the half-cycle (e.g., hcycle_delay). The sampling control module 830 also controls the sampling at half-cycle granularity by controlling multiplexor 870 (e.g., using hcycle_sample), which selects between the output from the falling edge pipeline registers (860 and 862) and the output from the rising edge pipeline registers (850 and 852) for sampling by sampling register 880. FIGS. 12 and 13 below further describe the operation of using these sampling control values to generate the sampling pulse and to control the sampling at half-cycle granularity.

In some embodiments, some or all of the sampling control values are calculated within the memory interface module 800. In some of these embodiments, the position of the start of uncertainty period (cycle_delay0), the midpoint of uncertainty (cycle_delay1), the value of half of the serial clock cycle (sck_cycle_half), the half-cycle indication for midpoint (hcycle_delay) and the half-cycle sampling control (hcycle_sample) are calculated by hardware modules such as the uncertainty midpoint module 820. In some embodiments, software running on a processing unit can override some or all of these sampling control values.

In other embodiments, the functionality of the uncertainty midpoint module 820 is implemented by software, and all of the sampling control values are generated by software. In these embodiments, the software reads the output of the training module 810 to obtain readings of cycle_early, cycle_late, hcycle_early and hcycle_late and compute the values for cycle_delay1, cycle_delay0 and hcycle_delay for the sampling control module 830. In some other embodiments, the software determines the position of the sampling point directly and returns a control value for when a sampling pulse should be asserted and whether to select half-cycle sample (hcycle_sample).

A. Determining the Earliest and Latest Transitions

Figure 9:
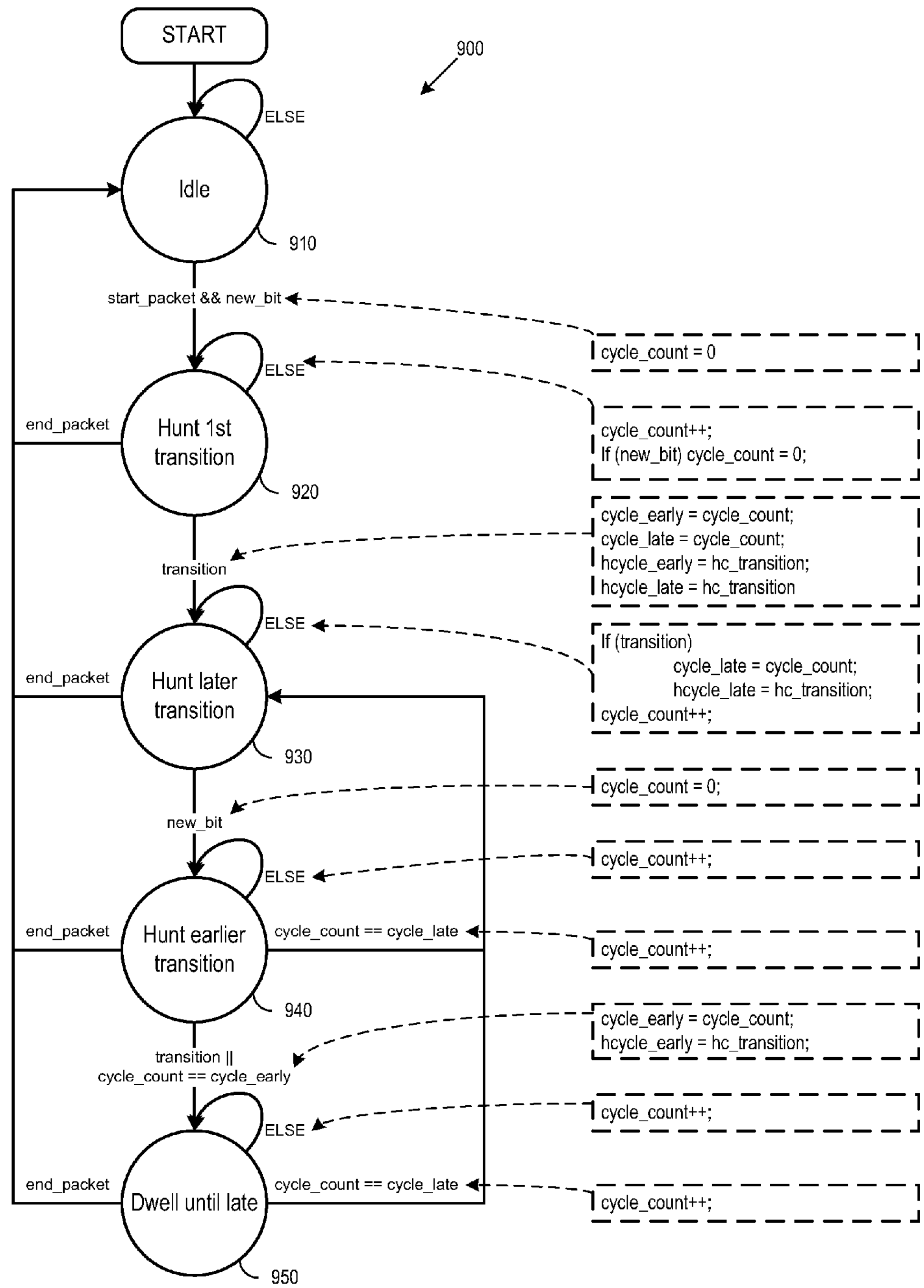
FIG. 9 conceptually illustrates an example process that a training module can perform to determine an earliest transition and a latest transition within a serial clock cycle.

For some embodiments, FIG. 9 conceptually illustrates an example process 900 that the training module 810 of FIG. 8 can perform to determine the earliest transition and the latest transition within a serial clock cycle. The process 900 uses a counter (cycle_count) to track the number of system clock cycles between various conditions and to provide a reading in terms of number of system clock cycles for when the earliest transition or the latest transition occur. When the training packet has completed (end of packet), regardless of the state of the process 900 and regardless of other signals received, the process 900 always returns to an idle state 910.

As shown in the figure, the process 900 initially starts (at 910) in the idle state until the system is ready to train the memory interface and to determine the uncertainty interval. The process proceeds to 920 when it receives both a start_packet and a new_bit to indicate that a training packet has started and that the serial clock is at the beginning of a cycle. As the process proceeds to 920, it also sets the cycle_count counter to 0.

At 920, the process 900 hunts for the first transition on the serial data by monitoring the transition signal. The cycle_count counter increments on every system clock cycle. The process stays in 920 until a transition is detected and the process proceeds to 930. As the process proceeds to 930, it records the cycle_count counter reading for both the earliest transition (cycle_early) and the latest transition (cycle_late). The half-cycle indication for both the earliest transition (hcycle_early) and the latest transition (hcycle_late) are also updated according to the reading of the hc_transition signal.

At 930, the process hunts for a later transition on the serial data by monitoring the transition signal. The cycle_count counter continues to increment on every system clock cycle. Whenever a transition on serial data is detected, the latest transition record (cycle_late) updates to the reading of the cycle_count counter, and the half-cycle indication for the latest transition (hcycle_late) updates according to the reading of the hc_transition signal. The process stays in 930 until a new_bit signal is received to indicate that a new serial clock cycle has started. When a new_bit signal is received, the process 900 proceeds to 940 and sets cycle_count to 0.

At 940, the process hunts for a transition earlier than the previously recorded earliest transition. The process stays in the 940 and increments the cycle_count counter on every system clock cycle until one of following conditions occurs: (i) cycle_count has reached the previously recorded latest transition (cycle_late), (ii) cycle_count has reached the previously recorded earliest transition (cycle_early), and (iii) a transition has been detected before cycle_count reaches the previous recorded earliest transition or previous recorded latest transition. If condition (i) occurs, the process proceeds to 930 to hunt for a new latest transition. If condition (ii) occurs, the process has failed to find a transition that is earlier than the recorded earliest transition and proceeds to 950. If condition (iii) occurs, a transition earlier than the previously recorded earliest transition has been detected. In this case, the earliest transition record (cycle_early) updates to the reading of the cycle_count counter, the half-cycle indication for the earliest transition updates to the reading of the hc_transition signal, and the process proceeds to 950.

At 950, the process continues to increment cycle_counter until the previously recorded latest transition (cycle_late) is reached. Once the previously recorded latest transition is reached, the process returns to 930 to hunt for a later transition.

B. Determining the Midpoint of Uncertainty at Half-Cycle Granularity

Figure 10:
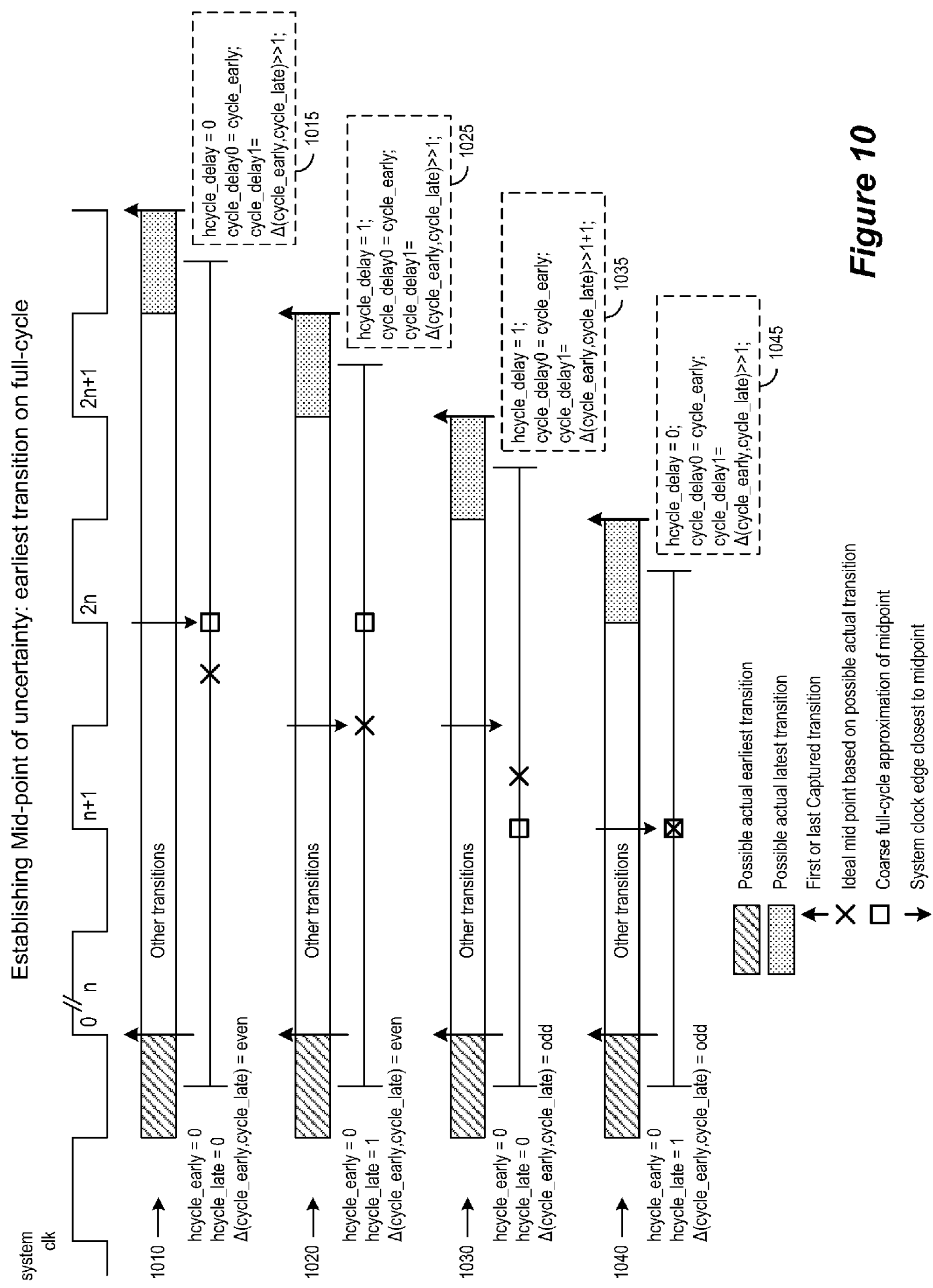
FIGS. 10-11 illustrates an identification of a midpoint of uncertainty at half-cycle granularity.
Figure 11:
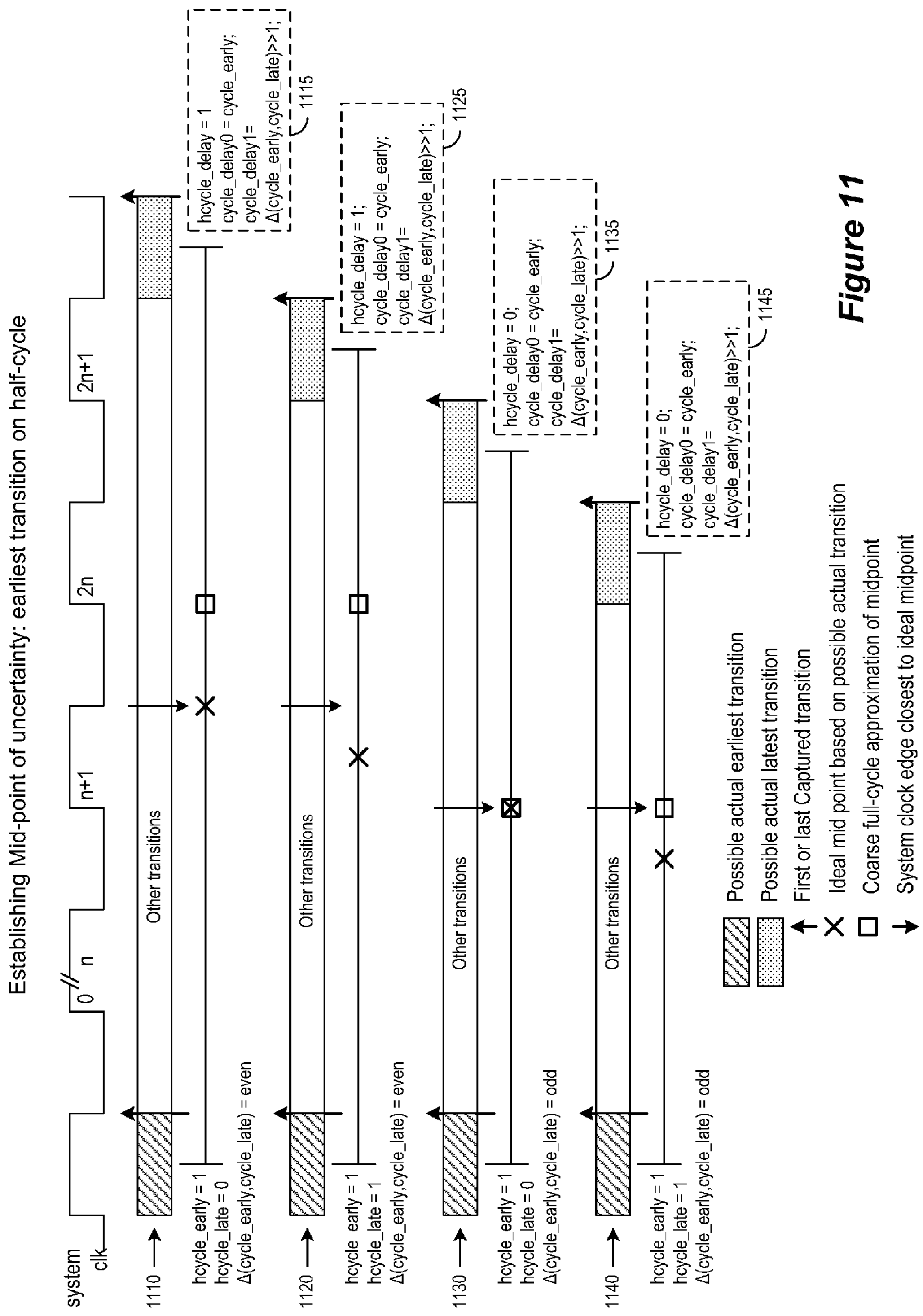

In order to establish a higher resolution sampling point at the granularity of half of a system clock cycle, some embodiments first identify the midpoint of uncertainty interval at the granularity of half of a system clock cycle. In some embodiments, this identification is made by examining whether the earliest and/or the latest transition are at the falling edge or the rising edge of the system clock, and whether there are an odd or even number of system clock cycles between the earliest and latest transitions. For some embodiments, FIGS. 10-11 illustrates the identification of the midpoint of uncertainty at half-cycle granularity that can be performed at 740 of the process 700. In some embodiments, the identification of the midpoint at half-cycle granularity is performed by the uncertainty midpoint module 820 of FIG. 8.

As illustrated in FIGS. 10-11, the midpoint of uncertainty at half-cycle granularity (represented by down arrow) is an approximation of the ideal midpoint to the closest rising or falling edge of the system clock. The ideal midpoint (represented by 'X') is based on the average of possible actual transitions rather than recorded transitions, and the ideal midpoint does not always fall on a system clock edge. (The average actual transition is one quarter of a cycle earlier than the recorded transition because an actual transition may occur anywhere within the half-cycle period before the recorded transition.)

To calculate the half-cycle granularity midpoint, some embodiments start with a coarse approximation of the midpoint (represented by squares) based on full-cycle components of the recorded transitions. In some embodiments, this coarse approximation of the midpoint is calculated as the truncation of the half of the difference between the recorded earliest transition (cycle_early) and the recorded latest transition (cycle_late). This is sometimes calculated as floor ((cycle_late−cycle_early)/2, or Δ(cycle_late, cycle_early)>>1. The half-cycle granularity is calculated by applying half-cycle offsets using half-cycle components of the recorded transitions (hcycle_early, hcycle_late). The calculated half-cycle granularity midpoint is used by the sampling control module 830 for determining a new sampling point. In some embodiments, the half-cycle granularity midpoint is expressed as the number of system clock cycles from the start of the uncertainty interval to the midpoint (e.g., cycle_delay1) and a bit to indicate whether the midpoint is at a rising or falling edge of the system clock (e.g., hcycle_delay). In other embodiments, the midpoint is expressed as the number of half clock cycles (i.e., the number of rising and falling system clock edges) between the start of the uncertainty interval and the midpoint. The start of the uncertainty interval (e.g., cycle_delay0) is the same as the full-cycle component of the recorded earliest transition (e.g., cycle_early) in some embodiments.

FIG. 10 illustrates four scenarios 1010, 1020, 1030 and 1040 that generate four sets of corresponding outputs 1015, 1025, 1035 and 1045. In each of these four scenarios, the earliest transition detected is at the rising edge of the system clock (indicated by hcycle_early=0). For the scenario 1010, the latest transition is detected at the rising edge of system clock cycle (hcycle_late=0), while the difference between the recorded earliest transition and the recorded latest transition consists of even numbers of system clock cycles. In this instance as illustrated by output set 1015, the coarse approximation of the midpoint falls on the system clock edge closest to the ideal midpoint, thus there is no need to apply a half cycle offset (hcycle_delay=0) and the coarse approximation is directly used as cycle_delay1.

For scenario 1020, the latest transition is detected at the falling edge of system clock cycle (hcycle_late=1), while the difference between the recorded earliest transition and the recorded latest transition consists of an even number of system clock cycles. In this instance as illustrated by output set 1025, the coarse approximation of the midpoint is one half-cycle after the system clock edge closest to the ideal midpoint, thus a half cycle offset needs to be applied (hcycle_delay=1) while the coarse approximation is used as cycle_delay1.

For scenario 1030, the latest transition is detected at the rising edge of system clock cycle (hcycle_late=0), while the difference between the recorded earliest transition and the recorded latest transition consists of an odd number of system clock cycles. In this instance as illustrated by output set 1035, the coarse approximation of the midpoint is one half-cycle before the system clock edge closest to the ideal midpoint, so a half-cycle offset needs to be added. However, for some embodiments in which hc_delay=1 represents an offset that is a half-cycle earlier in time, a one-cycle adjustment is added to the calculation of cycle_delay1 in order to represent a midpoint of uncertainty that is a half-cycle later than the coarse approximation.

For the scenario 1040, the latest transition is detected at the falling edge of system clock cycle (hcycle_late=1), while the difference between the recorded earliest transition and the recorded latest transition consists of an odd number of system clock cycles. In this instance as illustrated by output set 1045, the coarse approximation of the midpoint falls on the system clock edge closest to the ideal midpoint, thus there is no need to apply a half cycle offset (hcycle_delay=0) and the coarse approximation is directly used as cycle_delay1.

FIG. 11 illustrates four scenarios 1110, 1120, 1130 and 1140 that generates four sets of corresponding outputs 1115, 1125, 1135 and 1145. In each of these four scenarios, the earliest transition detected is at the falling edge of the system clock (indicated by hcycle_early=1). For the scenario 1110, the latest transition is detected at the rising edge of system clock cycle (hcycle_late=0), while the difference between the recorded earliest transition and the recorded latest transition consists of an even number of system clock cycles. In this instance as illustrated by output set 1115, the coarse approximation of the midpoint is one half cycle after the system clock edge closest to the ideal midpoint, thus a half cycle offset needs to be applied (hcycle_delay=1) while the coarse approximation is used as cycle_delay1.

For scenario 1120, the latest transition is detected at the falling edge of system clock cycle (hcycle_late=1), while the difference between the recorded earliest transition and the recorded latest transition consists of an even number of system clock cycles. In this instance as illustrated by output set 1125, the coarse approximation of the midpoint is one half-cycle after the system clock edge closest to the ideal midpoint, thus a half cycle offset needs to be applied (hcycle_delay=1) while the coarse approximation is used as cycle_delay1.

For scenario 1130, the latest transition is detected at the rising edge of system clock cycle (hcycle_late=0), while the difference between the recorded earliest transition and the recorded latest transition consists of an odd number of system clock cycles. In this instance as illustrated by output set 1135, the coarse approximation of the midpoint falls on the system clock edge closest to the ideal midpoint, thus there is no need to apply a half cycle offset (hcycle_delay=0) and the coarse approximation is directly used as cycle_delay1.

For the scenario 1140, the latest transition is detected at the falling edge of system clock cycle (hcycle_late=1), while the difference between the recorded earliest transition and the recorded latest transition consists of an odd number of system clock cycles. In this instance as illustrated by output set 1045, the coarse approximation of the midpoint falls on the system clock edge closest to the ideal midpoint, thus there is no need to apply a half cycle offset (hcycle_delay=0) and the coarse approximation is directly used as cycle_delay1.

Some embodiments use a truth table such as Table 1 below to calculate the half-cycle adjustment to the midpoint of uncertainty. For inputs, the truth table uses hcycle_early and hcycle_late in addition to a one-bit indication for whether the difference between the recorded earliest transition (cycle_early) and the recorded latest transition (cycle_late) has an odd or even number of system clock cycles. In some embodiments, the odd/even indication is the least significant bit of the difference. In some other embodiments, the odd/even indication is the XOR of the least significant bit of cycle_early and the least significant bit of cycle_late. For outputs, the truth table calculates hcycle_delay as well as a one-bit indication for whether an increment of 1 should be added to the coarse approximation of the midpoint in the calculation of cycle_delay1.

TABLE 1

Truth Table for half-cycle adjustment for determining midpoint

| Input | | | Output | |
|---|---|---|---|---|
| Δ(cycle_late, cycle_early) | hcycle_early | hcycle_late | hcycle_delay | increment |
| Even | 0 | 0 | 0 | 0 |
| Even | 0 | 1 | 1 | 0 |
| Even | 1 | 0 | 1 | 0 |
| Even | 1 | 1 | 1 | 0 |
| Odd | 0 | 0 | 1 | 1 |
| Odd | 0 | 1 | 0 | 0 |
| Odd | 1 | 0 | 0 | 0 |
| Odd | 1 | 1 | 0 | 0 |

C. Identifying Sampling Point at Half-Cycle Granularity

For some embodiments, FIGS. 12-13 illustrate an example of the identification of the sampling point at half-cycle granularity that can be performed at step 760 of process 700. In some embodiments, this operation is performed by the sampling control module 830 of FIG. 8. In other embodiments, this identification of a sampling point is performed by software. Once the sampling point has been identified, the sampling control module asserts the sampling pulse (sample enable) when the counter in the clock divider module 840 is at the count of the identified sampling point.

In some embodiments, the new sampling point is based on adding half of the serial clock period $T_{sck}$ to the midpoint of uncertainty, since this is the point in a serial clock cycle that is farthest away from invalid data due to uncertainty. In some embodiments, the new sampling point is coarsely computed by adding the start of uncertainty period (e.g., cycle_delay0), the midpoint of uncertainty (e.g., cycle_delay1), and the half of the serial clock period (e.g., sck_cycle_half), where cycle_delay0, cycle_delay1 and sck_cycle_half are expressed in number of system clock cycles. Some embodiments compute sck_cycle_half as floor ($T_{sck}$/2).

In order to identify the new sampling point to the nearest half clock cycle, some embodiments apply a half-cycle offset to the coarsely computed sampling point by examining whether the midpoint of uncertainty falls on falling edge or rising edge of the system clock and whether there are odd or even number of system clock cycles in a serial clock cycle. FIG. 12 illustrates the scenarios for when the serial clock cycle period $T_{sck}$ has an even number of system cycles, and FIG. 13 illustrates the scenarios for when the serial clock period $T_{sck}$ has an odd number of system clock cycles. Each scenario corresponds to a computed sampling point, each sampling point expressed as a position (fcycle_sample) of the sampling pulse in terms of the number of system clock cycles and a half-cycle adjustment signal (hcycle_sample). The half-cycle adjustment signal in some embodiments selects between rising edge and falling edge samples of serial data. In some embodiments, the sampling point identification operation illustrated in FIGS. 12-13 is implemented in software, and the software provides the fcycle_sample and hcycle_sample signals to the sampling control module 830 for generating the sampling pulse.

FIG. 12 illustrates two scenarios 1210 and 1220 along with their corresponding computed sampling points 1215 and 1225. In scenario 1210, both the midpoint of uncertainty 1212 and the computed sampling point 1215 are at the rising edge of the system clock (hcycle_delay=0, hcycle_sample=0) because serial clock period $T_{sck}$ has an even number of system clock cycles (18) and adding half of $T_{sck}$ to the midpoint of uncertainty would not include a half-cycle offset. The position of the sampling point is thus the same as the coarsely computed sampling point based on the sum of cycle_delay0, cycle_delay1, and sck_cycle_half.

In scenario 1220, both the midpoint of uncertainty 1222 and the computed sampling point 1225 are at the falling edge of the system clock (hcycle_delay=1, hcycle_sample=1), because serial clock period $T_{sck}$ has an even number of system clock cycles (18), and adding half of $T_{sck}$ to the midpoint of uncertainty would not include a half-cycle offset. The position of the sampling point is thus the same as the coarsely computed sampling point based on the sum of cycle_delay0, cycle_delay1, and sck_cycle_half.

FIG. 13 illustrates two scenarios 1310 and 1320 along with their corresponding computed sampling points 1315 and 1325. In scenario 1310, the midpoint of uncertainty 1312 is at the rising edge of the system clock (hcycle_delay=0), while the computed sampling point 1315 is at the falling edge of the system clock (hcycle_sample=1). This is because the serial clock period $T_{sck}$ has an odd number of system clock cycles (17), and adding half of $T_{sck}$ to the midpoint of uncertainty adds a half-cycle offset. Since hcycle_sample=1 represents a half-cycle offset that is earlier in time in some embodiments, an increment of 1 is added to the coarsely computed sampling point in order to achieve a half-cycle offset that is later in time.

In scenario 1320, the midpoint of uncertainty 1322 is at the falling edge of the system clock (hcycle_delay=1) while the computed sampling point 1315 is at the rising edge of the system clock (hcycle_sample=0). This is because serial clock period $T_{sck}$ has an odd number of system clock cycles (17), and adding half of $T_{sck}$ to the midpoint of uncertainty adds a half-cycle offset. However, since the midpoint of uncertainty 1322 already has a half-cycle offset, the position of the sampling point would remain the same as the coarsely computed sampling point based on the sum of cycle_delay0, cycle_delay1, and sck_cycle_half.

Some embodiments use a truth table such as Table 2 below to calculate the half-cycle adjustment to the sampling point. For inputs, the truth table uses hcycle_delay and a one bit indication of whether there are an odd or even number of system clock cycles in a serial clock cycle. For outputs, the truth table calculates hcycle_sample and a one bit indication of whether an adjustment of 1 cycle should be added to the coarsely computed sampling point.

TABLE 2

Truth Table for half-cycle adjustment for determining sampling point

| Input | | Output | |
|---|---|---|---|
| # of serial clock cycles | hcycle_delay | hcycle_sample | cycle adjust |
| Even | 0 | 0 | 0 |
| Even | 1 | 1 | 0 |
| Odd | 0 | 1 | 1 |
| Odd | 1 | 0 | 0 |

V. MEMORY INTERFACE IN A CONFIGURABLE IC

Some embodiments include the memory interface module in an IC that includes one or more configurable circuits. The memory interface module is for retrieving configuration data for configuring the configurable circuits. The configurable circuits in the IC can be configured to perform different functions according to different sets of configuration data. In some of these embodiments, the configurable circuits include configurable logic circuits and configurable interconnect circuits. In some of these embodiments, some or all of these configurable circuits are run-time reconfigurable circuits. Examples of ICs that include real-time reconfigurable logic circuits and real-time reconfigurable interconnect circuits can be found in U.S. Pat. No. 7,295,037. In some of these embodiments, the IC includes a configuration controller that processes the configuration data and configures the configurable circuits through a configuration network (CN). Examples of configuration controllers and configuration networks can be found in U.S. Pat. No. 7,375,550. In some embodiments, the memory controller is included within the configuration controller.

Figure 14:
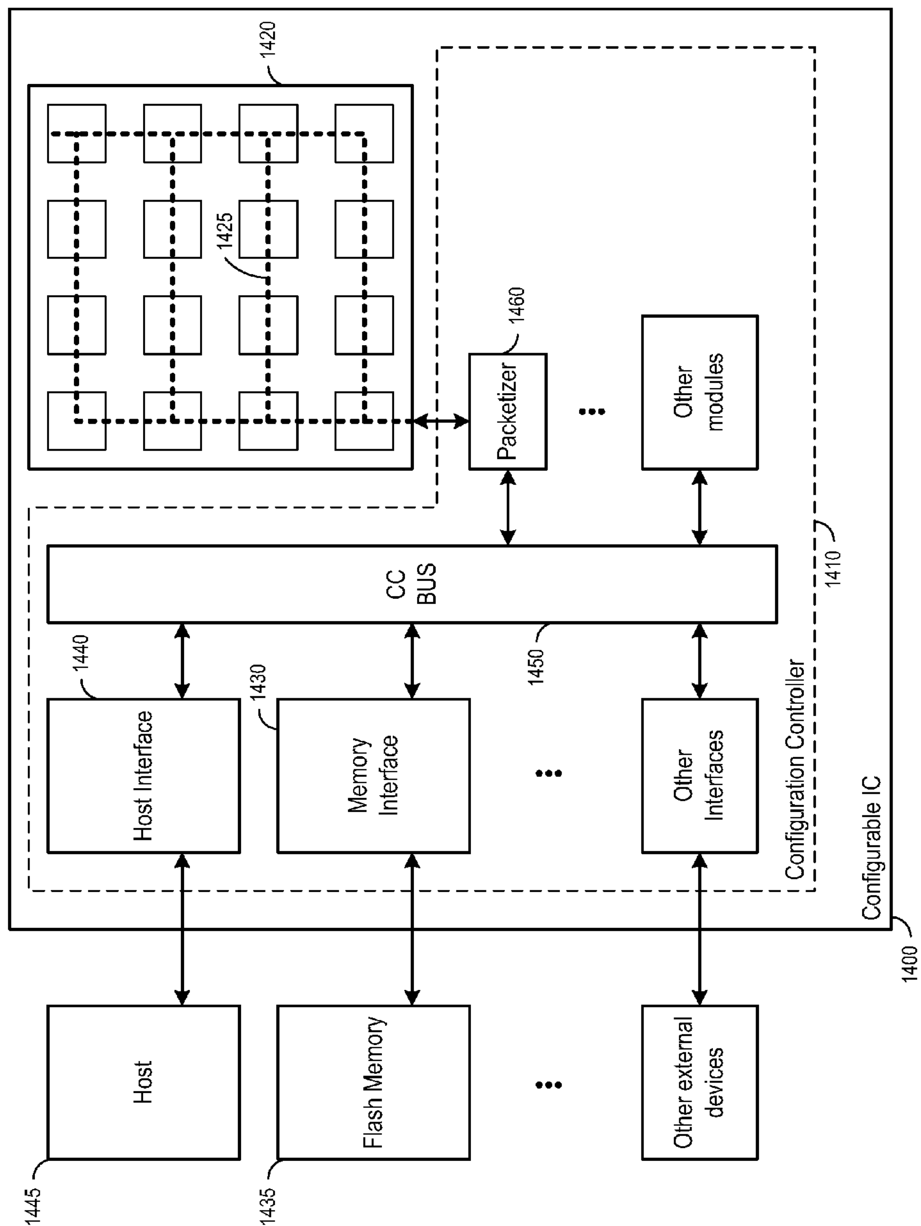
FIG. 14 illustrates an example configurable IC that includes a memory interface module for retrieving configuration data from a flash device for configuring configurable circuits in the IC.

For some embodiments, FIG. 14 illustrates an example configurable IC 1400 that includes a memory interface module for retrieving configuration data from a flash device for configuring configurable circuits in the IC. The configurable IC 1400 also includes a fabric of configurable circuits 1420 and a configuration controller 1410 that includes the memory interface 1430. The IC 1400 interfaces with a host device 1445, a flash memory device 1435, and other external devices.

The configuration controller 1410 processes configuration data and configures the configurable circuits in the fabric 1420. The configuration controller includes a number of modules for receiving or retrieving configuration data from external devices and for processing and delivering configuration data to the fabric of configurable circuits 1420. As illustrated, the configuration controller 1410 includes a memory interface module 1430, a host interface 1440, a configuration controller bus (CC bus) 1450, a packetizer 1460 and other modules.

The memory interface module 1430 provides the connection between the IC and the flash memory 1435. In some embodiments, the memory interface module 1430 retrieves data from the flash memory 1435, where at least some of the data retrieved is configuration data for configuring the configurable circuits in the fabric 1420. In some embodiments, the memory interface 1430 provides a serial clock to the flash memory and retrieves data from the flash memory 1435 via a serial data path. The retrieved data on the serial data path is sampled and delivered to the configuration control bus 1450. In some of these embodiments, one or more data packet stored in the flash memory 1435 provides data transitions on the serial data path that facilitates the adjustment of the serial clock frequency and of the serial data sampling time. In some embodiments, the memory interface 1430 communicates with the flash memory 1430 through a serial peripheral interface (SPI), where the serial clock and the serial data signals of the memory interface map into some of the signals of the SPI interface.

In some embodiments, the memory interface module 1430 includes various control values and status signals, and these control values and status signals can be accessed by other modules via the configuration control bus 1450. For example, a software application running on the host device 1445 can access these control values and status signals in the memory interface 1430 through the host interface module 1440 and the configuration controller bus 1450.

The host interface module 1440 provides the connection between a host computing device 1445 and the configurable IC 1400. In some embodiments, the host interface module 1440 is a multiple bit wide data bus that allows the host computing device 1445 to communicate with the configurable IC 1400. As illustrated, the host interface module 1440 provides the path for the host device 1445 to access other modules of the configurable IC through the configurable control bus 1450. For example, the host device 1445 can provide configuration data to the configurable circuits in the fabric 1420 via the host interface 1440 and the configuration control bus 1450. The host device 1445 can also access control values and status signals in the memory interface 1430 via the host interface 1440 and the configuration control bus 1450. In some of these embodiments, a software application running in the host device 1445 can adjust the frequency of the serial clock and the sampling time for the serial data via the memory interface module 1430.

In some embodiments, the configurable IC 1400 may also include a number of other interfaces for communication with other external devices. Some of these embodiments include a JTAG interface for communication with JTAG compliant modules. In some embodiments, some or all of these other interface modules provide paths for configuration data to be delivered from external devices to the configurable circuits in the fabric 1420. Some embodiments of the configurable IC 1400 also include other modules that do not directly interface with external devices.

The configuration control bus 1450 provides the path for various modules of the configuration controller 1410 to communicate with each other. It also provides the paths for configuration data from external devices to be used for configuring the configurable circuits in the fabric 1420. In some embodiments, each module interfacing the configuration controller bus 1450 packages data in a particular format for delivery to the configuration controller bus.

The packetizer module 1460 receives configuration data from configuration control bus 1450 and processes the received configuration data for delivery to the configurable circuits via the configuration network. In some embodiments, the packetizer 1460 formats data received from the configuration controller 1410 into command and data packets for the configuration network 1425.

The fabric of configurable circuits 1420 includes one or more configurable circuits. In some of these embodiments, the configurable circuits includes configurable logic circuits and configurable interconnect circuits. In some of these embodiments, some or all of these configurable circuits are run-time reconfigurable circuits. In some embodiments, the configurable circuits are organized into tiles. The tiles of configurable circuits are interconnected by a configuration network 1425, which allows configuration data to be delivered to the configurable circuits for purpose of configuring these configurable circuits to perform user defined or designed functions. The configuration network receives configuration data from the configuration controller 1410, which uses the packetizer module 1460 to deliver configuration data to the configuration network.

VI. RETRIEVING PARALLEL DATA FROM EXTERNAL STORAGE DEVICE

Several embodiments described above describe the memory interface module as an interface between an external flash memory and a configuration controller of an IC with configurable or reconfigurable circuits. However, one of ordinary skill would recognize that other devices can use the memory interface module as an interface between any external data storage device and any circuit module of any IC.

Figure 15:
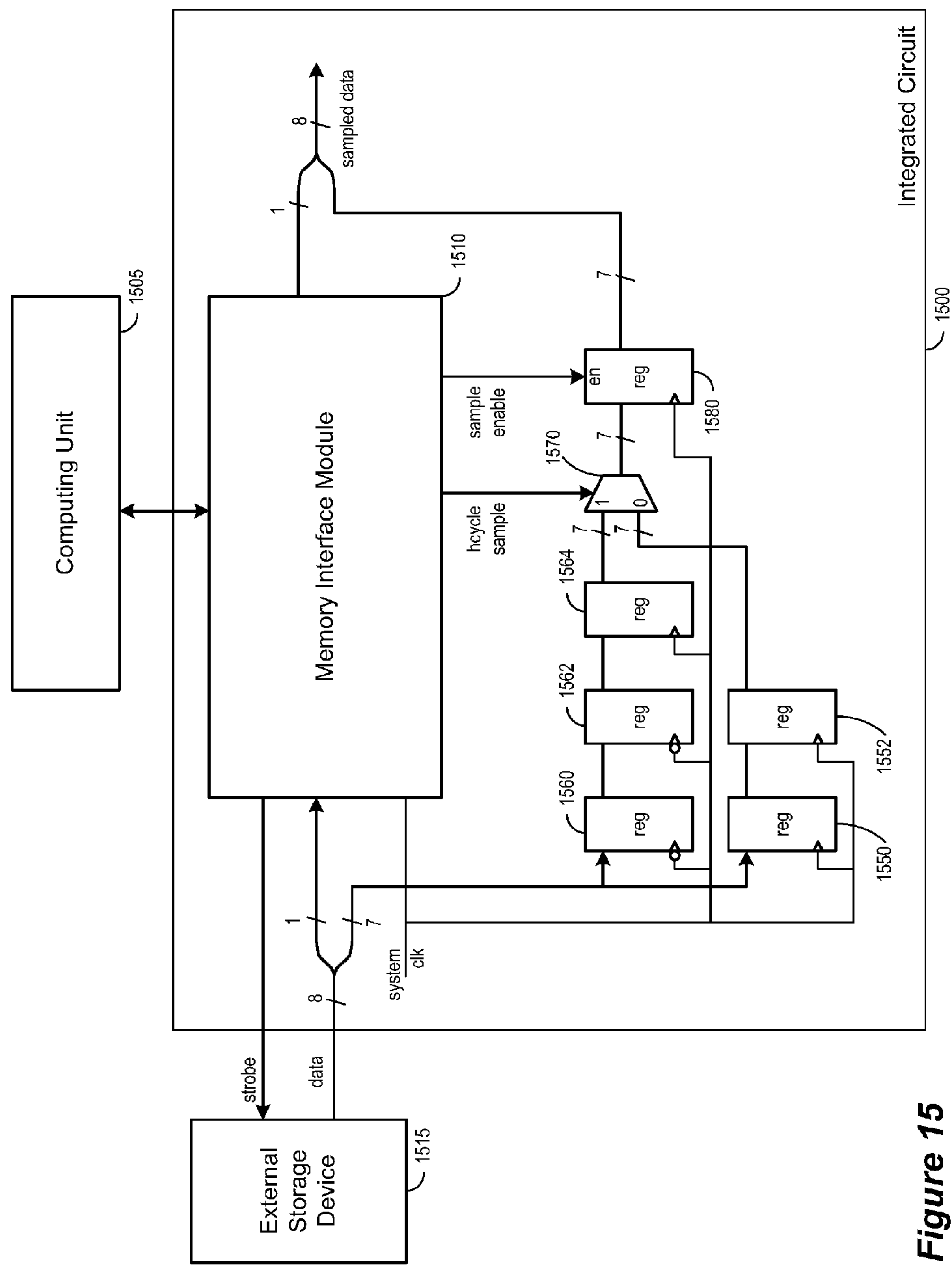
FIG. 15 illustrates an example of an IC that uses a memory interface to optimize performance for data retrieval from an external storage device that delivers one or more data bits in parallel to the IC.

For example, some embodiments use the memory interface as discussed above to optimize performance for data retrieval from an external storage device that delivers one or more data bits in parallel to an IC. FIG. 15 illustrates an example of such an IC 1500. As illustrated in FIG. 15, the IC 1500 includes a memory interface module 1510 for facilitating optimization of data retrieval from an external data storage device 1515. The IC 1500 also communicates with a computing or processing unit 1505 that is running a software application.

The external storage device 1515 sources a set of data bits upon receiving an active edge on a strobe signal received from the IC 1500. The external storage device 1515 can be flash, SRAM, DRAM, EEPROM or another type of memory or data storage device that produces data based on one or more strobe signals. In some embodiments, the external storage device 1515 is a single physical device that sources one or more data bits for each strobe signal it receives. For example, in some embodiments, the external storage device 1515 is a SPI compliant flash device that sources multiple channels of serial data for every active serial clock edge it receives. In some other embodiments, the external storage device 1515 includes two or more physical devices, each physical device sourcing one or more bits of the parallel data. In some embodiments, the external storage device 1515 is a storage element controlled by an external computing device that actively delivers or writes data to the IC, and the storage element can include some or all of the following: a latch, a flip-flop, a SRAM, a DRAM, a ROM, or a flash.

The width of data retrieved from the storage device is illustrated as one byte in FIG. 15. One of ordinary skill would recognize that the data width of a byte is arbitrarily chosen only for the purpose of illustration, and that some embodiments work with external storage devices of other data widths. One of ordinary skill would also recognize that in some embodiments, not all bits of the read data need be connected to the IC 1500. In some embodiments, the set of data comprises only 1 logical bit.

The processing unit 1505 is for controlling some or all of the operations of the IC 1500. In some embodiments, the processing unit 1505 controls the operations of the memory interface module 1510 by implementing a process that is similar to the process 700 as described above by reference to FIG. 7. In some embodiments, the processing unit 1505 executes a software/firmware application that reads status from the memory interface module 1510 for deriving a new operational frequency for the strobe signal and a new sampling point for the set of data retrieved from the external storage device 1515. In some of these embodiments, the software running on the processing unit also evaluates a number of factors in order to determine timing delay uncertainties for deriving the new frequency and the sampling point. In some embodiments, the processing unit is physically part of the IC 1500. In other embodiments, the processing unit 1515 is part of an external host computing device that controls the operation of the IC 1500.

The IC 1500 is an electronic device that retrieves data from the external storage device 1515 for performing one or more operations. In some embodiments, the IC 1500 includes one or more storage elements and/or one or more computing elements. In some embodiments, one or more of these computing or storage elements are configurable or reconfigurable circuits as described earlier by reference to FIG. 14. In some other embodiments, none of the computing and storage elements in the IC 1500 is a configurable or reconfigurable circuit.

The IC 1500 retrieves or receives one or more bits of data from the external storage device 1515 by asserting a strobe signal. For each data retrieval cycle, the IC 1500 receives a set of data bits from the external storage device 1515 following each active edge of the signal (which may be rising or falling depending on the specification of the device). In some embodiments, the strobe signal is a serial clock signal such as the SCK signal of a SPI compliant flash device. In some other embodiments, the strobe signal can be an address strobe, a read strobe, or any other strobe signal that causes the external storage device 1515 to source a set of data. In some other embodiments, the strobe signal is a handshake signal from the IC 1500 to indicate that the IC is ready to accept the next set of bits from the external storage device 1515.

The IC 1500 includes the memory interface module 1510. In some embodiments, the memory interface module 1510 is similar to some of the embodiments described by reference to FIG. 8 above. The memory interface module 1510 is for recording the earliest and latest transitions on one of the data bits from the external storage device 1515. In some embodiments, recorded earliest and latest transitions are for determining an interval of uncertainty in between the active edges of the strobe signal. In some embodiments, the memory interface module 1510 is also for sampling one of the bits of the data received/retrieved from the external storage device 1515. The sampled data bit is delivered to other circuits of the IC 1500. The memory interface module 1510 also sources the strobe signal to the external storage device 1515. In some embodiments, the strobe signal is based on a serial clock that is derived based on the system clock. In some other embodiments, the strobe signal is a periodic pulse produced by a sequencing logic that operates on the system clock, where the period between pulses is determined by examining transitions and the interval of uncertainty as described earlier by reference to FIGS. 7-13.

For some embodiments that retrieve more than one bit of data from the external storage device 1515, the IC 1500 also includes a number of discrete logic components for sampling other bits of the data from the external storage device 1515. These discrete logic components in some embodiments include: rising edge pipeline registers 1550 and 1552, falling edge pipeline registers 1560 and 1562, a falling to rising edge synchronization register 1564, a half-cycle sample selection multiplexor 1570, and a sampling register 1580. For an IC 1500 that retrieves N bits of data from the external storage device 1515 for each strobe edge, the data width of each of these discrete components is N−1 bits.

The rising edge pipeline registers 1550 and 1552 clock in data from the external storage 1515 on rising edges of the system clock and the falling edge pipeline registers 1560 and 1562 clock in data from external storage device 1515 on falling edges of the system clock. In some embodiments, the number of stages of pipeline registers is identical to the number of stages of pipeline registers in the memory interface module 1510. The last falling edge pipeline register 1562 sends its output to the falling to rising edge synchronization register 1564. The falling to rising edge synchronization register 1564 in turn synchronizes the output of falling edge pipeline register 1562 to the rising edges of the system clock.

In the example illustrated, the half-cycle sampling signal in the memory interface module 1530 also controls the half-cycle sampling of these other data bits by controlling multiplexor 1570 (e.g., using hcycle_sample), which selects between the output from the falling edge pipeline registers (1560 and 1562) and the output from the rising edge pipeline registers (1550 and 1552) for sampling by sampling register 1580. The sampling register 1580 samples the data bits upon receiving a sampling pulse from memory interface 1510. The data bits sampled at register 1580 are delivered to other circuits of the IC 1500 along with the one data bit sampled by the memory interface module 1510.

What is claimed is:

1. A method for retrieving data from a data storage device to an integrated circuit (IC), the method comprising:

at the IC, detecting a first earlier transition and a second later transition on a device input interconnect within a first clock period;

determining an interval of uncertainty based on the detected first and second transitions on the device input interconnect;

retrieving data from the data storage device based on the determined interval of uncertainty; and determining a second clock period that is at least twice as long as an interval of time between a midpoint of the interval of uncertainty and an end point of the interval of uncertainty.

2. The method of claim 1 further comprising determining a sampling time in the first clock period, wherein the sampling time is at an earliest time following the interval of uncertainty at which the device input interconnect does not transition.

3. The method of claim 1, wherein the first clock period is chosen to ensure that the interval of uncertainty does not overlap a next interval of uncertainty.

4. The method of claim 1 further comprising retrieving a packet stored in the data storage device to cause transitions on the device input interconnect.

5. The method of claim 4, wherein the packet is used to test effects of parasitic electrical elements in a system that includes the IC and the data storage device.

6. An integrated circuit (IC) that retrieves data from a data storage device by sampling a device input interconnect, the IC comprising:

a transition detecting circuit for determining an interval of uncertainty that represents a duration in a sampling clock period within which it is uncertain whether a transition would occur on the device input interconnect;

a sampling circuit for sampling the retrieved data at a sampling time within the sampling clock period that is not in the interval of uncertainty; and a sampling time determining circuit for determining the sampling time based on (i) whether a midpoint of the interval of uncertainty is at a rising edge or a falling edge of a system clock and (ii) whether a number of system clock cycles in the sampling clock period is odd or even.

7. The IC of claim 6, wherein the transition detecting circuit detects data transitions at both rising and falling edges of the system clock, wherein the system clock has a faster frequency than a frequency associated with the sampling clock period.

8. The IC of claim 6 further comprising an uncertainty midpoint determining circuit for determining the midpoint of the interval of uncertainty, wherein the midpoint of the interval of uncertainty is used by the sampling time determining circuit.

9. The IC of claim 8, wherein the uncertainty midpoint determining circuit determines whether the midpoint is at the rising edge or the falling edge of the system clock.

10. The IC of claim 6, wherein the transition detecting circuit determines the interval of uncertainty by detecting a first earlier transition and a second later transition within the sampling clock period.

11. The IC of claim 10 further comprising an uncertainty midpoint determining circuit for determining the midpoint of the interval of uncertainty based on (i) a first clock edge used to detect the first transition, (ii) a second clock edge used to detect the second transition, and (iii) a number of system clock cycles between the first transition and the second transition.

12. The IC of claim 6 further comprising a sampling clock generator circuit, wherein the sampling clock generator circuit generates the sampling clock based on a sampling clock period specification.

13. The IC of claim 12 further comprising a sampling frequency determining circuit for providing the sampling clock period specification, wherein the sampling clock period specification is based on the determined interval of uncertainty.

14. The IC of claim 6 further comprising a plurality of configurable circuits, wherein the data retrieved from the data storage device is for configuring the plurality of configurable circuits.

15. An electronic device comprising:

a data storage device; and an integrated circuit (IC) that retrieves data from the data storage device by sampling a device input interconnect, wherein the IC comprises:

a transition detecting circuit for (i) determining an interval of uncertainty that represents a duration in a sampling clock period within which it is uncertain whether a transition would occur on the device input interconnect and (ii) detecting data transitions at both rising and falling edges of a system clock, wherein the system clock has a faster frequency than a frequency associated with the sampling clock period; and a sampling circuit for sampling the retrieved data at a sampling time within the sampling clock period that is not in the interval of uncertainty.

16. The electronic device of claim 15, wherein the IC further comprises a sampling clock generator circuit, wherein the sampling clock generator circuit generates a sampling clock based on a sampling clock period specification.

17. The electronic device of claim 16, further comprising a sampling frequency determining module for providing the sampling clock period specification, wherein the sampling clock period specification is based on the determined interval of uncertainty.

18. The electronic device of claim 15, wherein the IC further comprises a plurality of configurable circuits, wherein the data retrieved from the data storage device is for configuring the plurality of configurable circuits.

19. The electronic device of claim 15, wherein the IC further comprises a sampling time determining circuit for determining the sampling time based on (i) whether a midpoint of the interval of uncertainty is at the rising edge or the falling edge of the system clock and (ii) whether a number of system clock cycles in a sampling clock period is odd or even.

20. The method of claim 1 further comprising retrieving data from the data storage device based on the second clock period.

* * * * *